United States Patent
Daher et al.

(10) Patent No.: US 11,704,924 B2
(45) Date of Patent: *Jul. 18, 2023

(54) METHOD, APPARATUS, AND COMPUTER-READABLE STORAGE MEDIUM FOR RECOGNIZING CHARACTERS IN A DIGITAL DOCUMENT

(71) Applicant: LEAD TECHNOLOGIES, INC., Charlotte, NC (US)

(72) Inventors: Moe Daher, Charlotte, NC (US); Waseem Shadid, Charlotte, NC (US)

(73) Assignee: LEAD TECHNOLOGIES, INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,963

(22) Filed: Oct. 28, 2022

(65) Prior Publication Data

US 2023/0051051 A1    Feb. 16, 2023

Related U.S. Application Data

(63) Continuation of application No. 17/335,547, filed on Jun. 1, 2021, now Pat. No. 11,488,407.

(51) Int. Cl.
*G06V 30/00* (2022.01)
*G06V 30/413* (2022.01)
(Continued)

(52) U.S. Cl.
CPC ........ *G06V 30/413* (2022.01); *G06V 30/1801* (2022.01); *G06V 30/18105* (2022.01);
(Continued)

(58) Field of Classification Search
CPC ................................................ G06V 30/00–43
See application file for complete search history.

(56) References Cited

U.S. PATENT DOCUMENTS 4,910,787 A * 3/1990 Umeda ............. G06V 30/2455
382/173
2003/0215113 A1   11/2003 Yoder
(Continued)

FOREIGN PATENT DOCUMENTS

JP    2006-107534    4/2006

OTHER PUBLICATIONS

Silva, L. et al., "Automatic Discrimination between Printed and Handwritten Text in Documents" Oct. 2009. DOI:10.1109/SIBGRAPI.2009.40.

(Continued)

*Primary Examiner* — Sean T Motsinger
(74) *Attorney, Agent, or Firm* — Oblon, McClelland, Maier & Neustadt, L.L.P.

(57) ABSTRACT

Method, computer readable medium, and apparatus of recognizing character zone in a digital document. In an embodiment, the method includes classifying a segment of the digital document as including text, calculating at least one parameter value associated with the classified segment of the digital document, determining, based on the calculated at least one parameter value, a zonal parameter value, classifying the segment of the digital document as a handwritten text zone or as a printed text zone based on the determined zonal parameter value and a threshold value, the threshold value being based on a selection of an intersection of a handwritten text distribution profile and a printed text distribution profile, each of the handwritten text distribution profile and the printed text distribution profile being associated with a zonal parameter corresponding to the determined zonal parameter value, and generating, based on the classifying, a modified version of the digital document.

20 Claims, 10 Drawing Sheets

(51) Int. Cl.
*G06V 30/32* (2022.01)
*G06V 30/18* (2022.01)
*G06V 30/226* (2022.01)
*G06V 30/19* (2022.01)

(52) U.S. Cl.
CPC ...... *G06V 30/19173* (2022.01); *G06V 30/226* (2022.01); *G06V 30/36* (2022.01)

(56) References Cited

U.S. PATENT DOCUMENTS

| | | |
|---|---|---|
| 2007/0065003 A1 | 3/2007 | Kellerman et al. |
| 2007/0133877 A1 | 6/2007 | Wang |
| 2009/0060335 A1 | 3/2009 | Rodriguez Serrano et al. |
| 2012/0308127 A1* | 12/2012 | Kudoh ............. G06V 30/18105 382/165 |
| 2013/0156302 A1 | 6/2013 | Rodriguez Serrano et al. |
| 2014/0072217 A1 | 3/2014 | Xo et al. |
| 2015/0339543 A1* | 11/2015 | Campanelli .......... G06V 30/413 382/182 |
| 2022/0122367 A1* | 4/2022 | O'Gara ................ G06F 16/248 |

OTHER PUBLICATIONS

International Search Report and Written Opinion dated Sep. 9, 2021 in PCT/US 21/35408, 13 pages.

Dr. Rajesh Pathak, Ravi Kumar Tewari; Distinction between Machine Printed Text and Handwritten Text in a Document International Journal of Scientific Engineering and Research (IJSER) (Year: 2014).

* cited by examiner

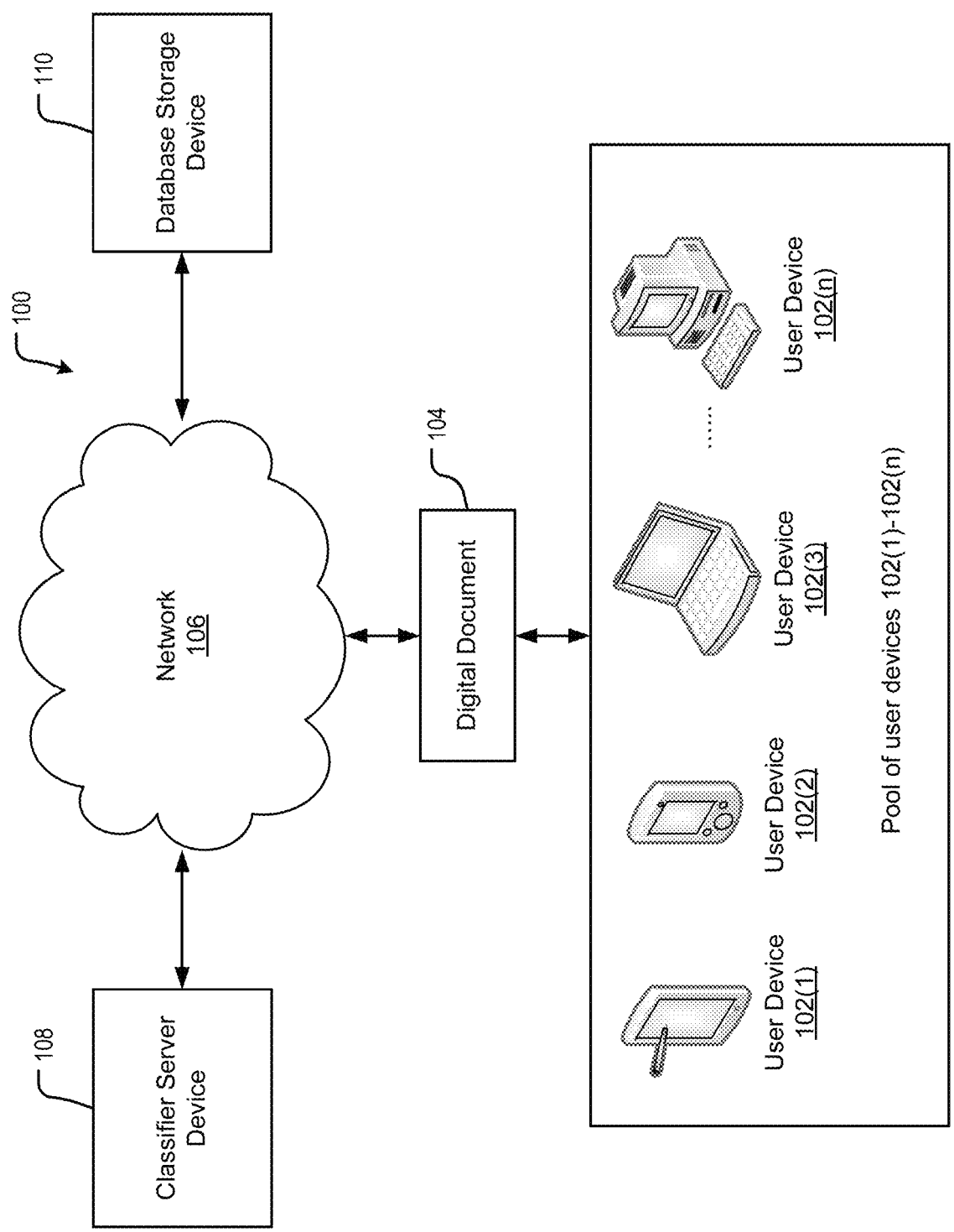

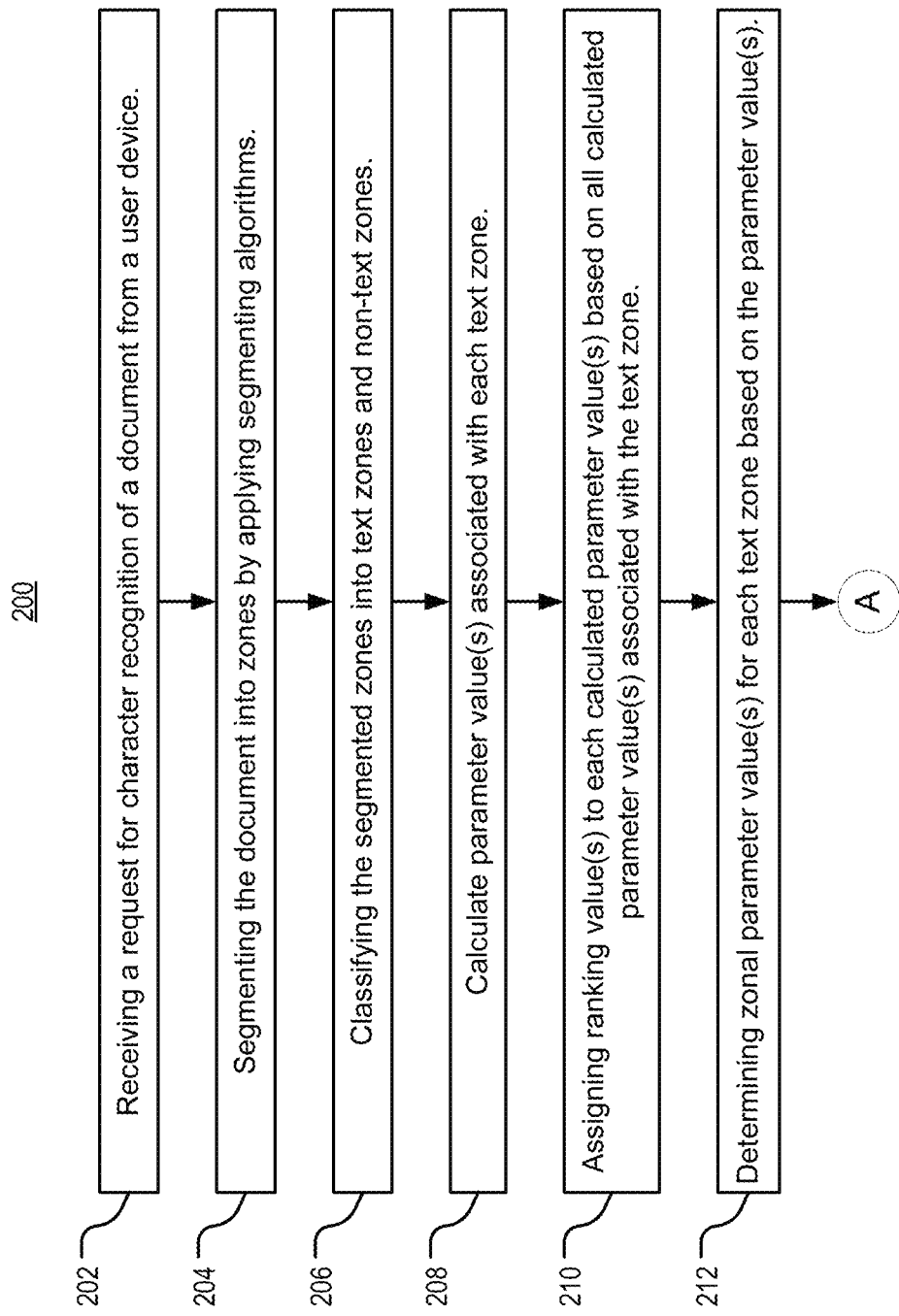

METHOD, APPARATUS, AND COMPUTER-READABLE STORAGE MEDIUM FOR RECOGNIZING CHARACTERS IN A DIGITAL DOCUMENT

CROSS-REFERENCE TO RELATED APPLICATIONS

The present application is a continuation of U.S. application Ser. No. 17/335,547, filed Jun. 1, 2021, the entire content of which is incorporated by reference herein in its entirety for all purposes.

BACKGROUND

Field of the Disclosure

The present disclosure relates generally to the field of character recognition. Specifically, the present disclosure relates to recognizing handwritten characters and printed characters.

Description of the Related Art

Typically, character recognition is performed using various character recognition algorithms. Current character recognition methodologies utilized for recognizing handwritten characters and printed characters are burdensome, slow, and inefficient, especially when documents include a high volume of characters that are to be processed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The present disclosure relates to recognition of characters in a digital document.

According to an embodiment, the present disclosure further relates to a method of recognizing a character in a digital document, the method comprising classifying, by processing circuitry, a segment of the digital document as including text, calculating, by the processing circuitry, at least one parameter value associated with the classified segment of the digital document, determining, by the processing circuitry and based on the calculated at least one parameter value, a zonal parameter value, classifying, by the processing circuitry, the segment of the digital document as a handwritten text zone or as a printed text zone based on the determined zonal parameter value and a threshold value, the threshold value being based on a selection of an intersection of a handwritten text distribution profile and a printed text distribution profile, each of the handwritten text distribution profile and the printed text distribution profile being associated with a zonal parameter corresponding to the determined zonal parameter value, and generating, by the processing circuitry and based on the classifying, a modified version of the digital document.

According to an embodiment, the present disclosure further relates to a non-transitory computer-readable medium storing instructions which when executed by a computer, cause the computer to perform a method of recognizing a character in a digital document, the method comprising classifying a segment of the digital document as including text, calculating at least one parameter value associated with the classified segment of the digital document, determining, based on the calculated at least one parameter value, a zonal parameter value, classifying the segment of the digital document as a handwritten text zone or as a printed text zone based on the determined zonal parameter value and a threshold value, the threshold value being based on a selection of an intersection of a handwritten text distribution profile and a printed text distribution profile, each of the handwritten text distribution profile and the printed text distribution profile being associated with a zonal parameter corresponding to the determined zonal parameter value, and generating, based on the classifying, a modified version of the digital document.

According to an embodiment, the present disclosure further relates to an apparatus for recognizing a character in a digital document, comprising processing circuitry configured to classify a segment of the digital document as including text, calculate at least one parameter value associated with the classified segment of the digital document, determine, based on the calculated at least one parameter value, a zonal parameter value, classify the segment of the digital document as a handwritten text zone or as a printed text zone based on the determined zonal parameter value and a threshold value, the threshold value being based on a selection of an intersection of a handwritten text distribution profile and a printed text distribution profile, each of the handwritten text distribution profile and the printed text distribution profile being associated with a zonal parameter corresponding to the determined zonal parameter value, and generate a modified version of the digital document based on the segment classification.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a block diagram of a character recognition system according to an embodiment of the present disclosure;

FIG. 2A is a flow chart illustrating a character recognition method according to an embodiment of the present disclosure;

DETAILED DESCRIPTION

Figure 2B:
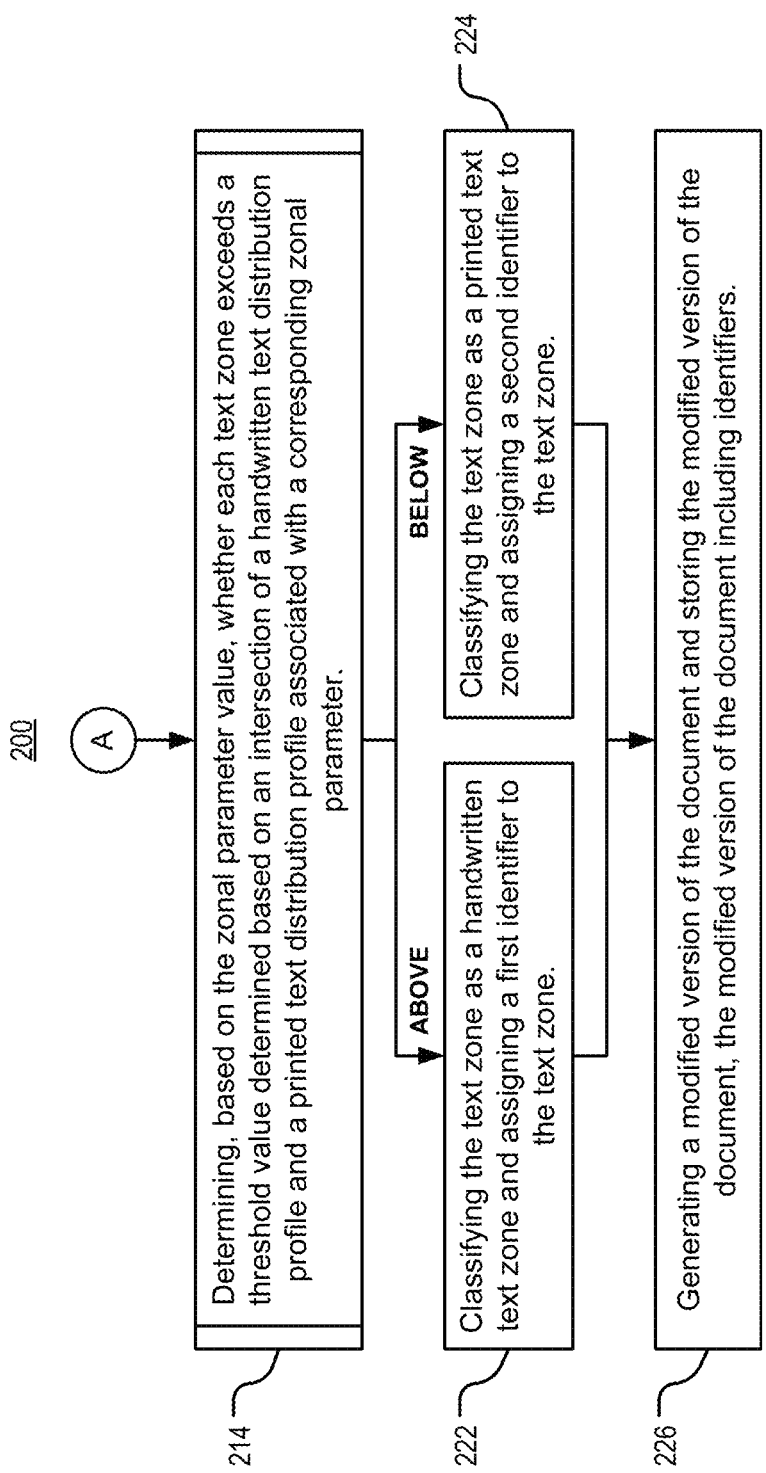
FIG. 2B is a flow chart illustrating a character recognition method according to an embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Furthermore, the terms "approximately," "proximate," "minor," and similar terms generally refer to ranges that include the identified value within a margin of 20%, 10% or preferably 5% in certain embodiments, and any values there between.

The term "user" and other related terms are used interchangeably to refer to a person using character recognition circuitry, a character recognition system, or a system sending inputs to the character recognition circuitry/system.

FIG. 1 is a block diagram of a character recognition system 100 according to an embodiment of the present disclosure. The character recognition system 100 includes user devices 102(1)-102(n), a digital document 104, network 106, a classifier server device 108, and a database storage device 110. User devices 102(1)-102(n) may also be referred to as pool of user devices 102(1)-102(n). Components of system 100 may include computing devices (e.g., computer(s), server(s), etc.) with memory storing data and/or software instructions (e.g., server code, client code, databases, etc.). In some embodiments, the one or more computing devices may be configured to execute software instructions stored on one or more memory devices to perform one or more operations consistent with the disclosed embodiments.

User devices 102(1)-102(n) may be a tablet computer device, a mobile phone, a laptop computer device, and/or a personal computer device, although any other user communication device may also be included. In certain embodiments, user devices 102(1)-102(n) may be a smartphone. However, the skilled artisan will appreciate that the features described herein may be adapted to be implemented on other devices (e.g., a server, an e-reader, a camera, a navigation device, etc.)

Digital document 104 may be a digital version of any document that may be stored or displayed on user devices 102(1)-102(n). Digital document 104 may be in any format such as a Portable Document Format (PDF), an image file such as a Joint Photographic Experts Group (JPEG) file format, a word processing document such as those commonly used in Microsoft Word (.doc, .docx), or other digital formats known to a person skilled in the art. Further, digital document 104 may be a digital version of a physical document that may be captured and converted into a digitized document by user devices 102(1)-102(n).

User devices 102(1)-102(n) may be a scanner, a fax machine, a camera or other similar devices that are utilized to convert a physical document to generate a digital document 104. It may be appreciated by a person skilled in the art that the present disclosure may not be limited to any particular device utilized to generate digital document 104. Digital document 104 may be any artifact having textual content. Digital document 104 may include printed text, handwritten text, graphics, barcodes, QR codes, lines, images, shapes, color, structures, format, layout, or other identifiers. Digital document 104 may be a form with input fields that may be filled by a user, a personal identification document that may include text, images or other identifiers, a letter, a note, or the like.

Network 106 may comprise one or more types of computer networking arrangements configured to provide communications or exchange data, or both, between components of system 100. For example, network 106 may include any type of network (including infrastructure) that provides communications, exchanges information, and/or facilitates the exchange of information, such as the Internet, a private data network, a virtual private network using a public network, a LAN or WAN network, a Wi-Fi™ network, and/or other suitable connections that may enable information exchange among various components of system 100. Network 106 may also include a public switched telephone network ("PSTN") and/or a wireless cellular network. Network 106 may be a secured network or unsecured network. In some embodiments, one or more components of system 100 may communicate directly through a dedicated communication link(s). User devices 102(1)-102(n), classifier server device 108, and database storage device 110 may be configured to communicate with each other over network 106.

Classifier server device 108 may be one or more network-accessible computing devices configured to perform one or more operations consistent with the disclosed embodiments, as described more fully below. As discussed below, classifier server device 108 may be a network device that stores instructions for classifying zones within digital document 104 as handwritten text zones or printed text zones.

Database storage device 110 may be communicatively coupled, directly or indirectly, to classifier server device 108 and user devices 102(1)-102(n) via network 106. Database storage device 110 may also be part of classifier server device 108 (i.e., not separate devices). Database storage device 110 may include one or more memory devices that store information and are accessed and/or managed by one or more components of system 100. By way of example, database storage device 110 may include Oracle™ databases, Sybase™ databases, or other relational databases or non-relational databases, such as Hadoop sequence files, HBase, or Cassandra. Database storage device 110 may include computing components (e.g., database operating system, network interface, etc.) configured to receive and process requests for data stored in memory devices of database storage device 110 and to provide data from database storage device 110. Database storage device 110 may be configured to store instructions for classifying zones within digital document 104 as handwritten text zones or printed text zones.

In an embodiment this technology is utilized to recognize handwritten character(s) and/or printed character(s) in a digital document 104. To briefly summarize, in an embodiment, a method of the present disclosure includes, first, segmenting a digital document. Next, the segments of the digital document may be classified into text zones and non-text zones. Each of the text zones can then be classified as including handwritten text or printed text based on one or more parameters associated with the text zone. Character recognition processes can then be applied to text zones based on their classification as being either a handwritten text zone or a printed text zone. For instance, an intelligent character recognition (ICR) process can be applied to handwritten text zones and an optical character recognition (OCR) process can be applied to printed text zones.

By classifying different text zones into respective types of text, each zone of the digital document does not need to be processed twice (i.e., by both ICR and OCR). This approach contrasts with conventional approaches that apply OCR to an entire area of a document without knowledge of or consideration for the contents of the document. For instance, though OCR may be acceptable for certain machine-generated text portions (i.e., printed text portions), it is inefficient and/or inaccurate at processing handwritten text portions. Thus, applying OCR to an entire document fails to provide speed or accuracy in processing documents containing text.

According to an embodiment, the method of the present disclosure may employ a single recognition module that performs each of the OCR processes and the ICR processes.

In an embodiment, the OCR process includes an algorithm that recognizes printed text in a digital document. The printed text recognized by the OCR algorithm may include alphabetical characters, numerical characters, and/or special characters; although any other digital character may also be included.

In an embodiment, the ICR process includes an algorithm that recognizes handwritten text in a digital document. Handwritten text that can be recognized by the ICR process includes alphabetical characters, numerical characters, and/or special characters; although any other handwritten character may also be included.

Figure 2C:
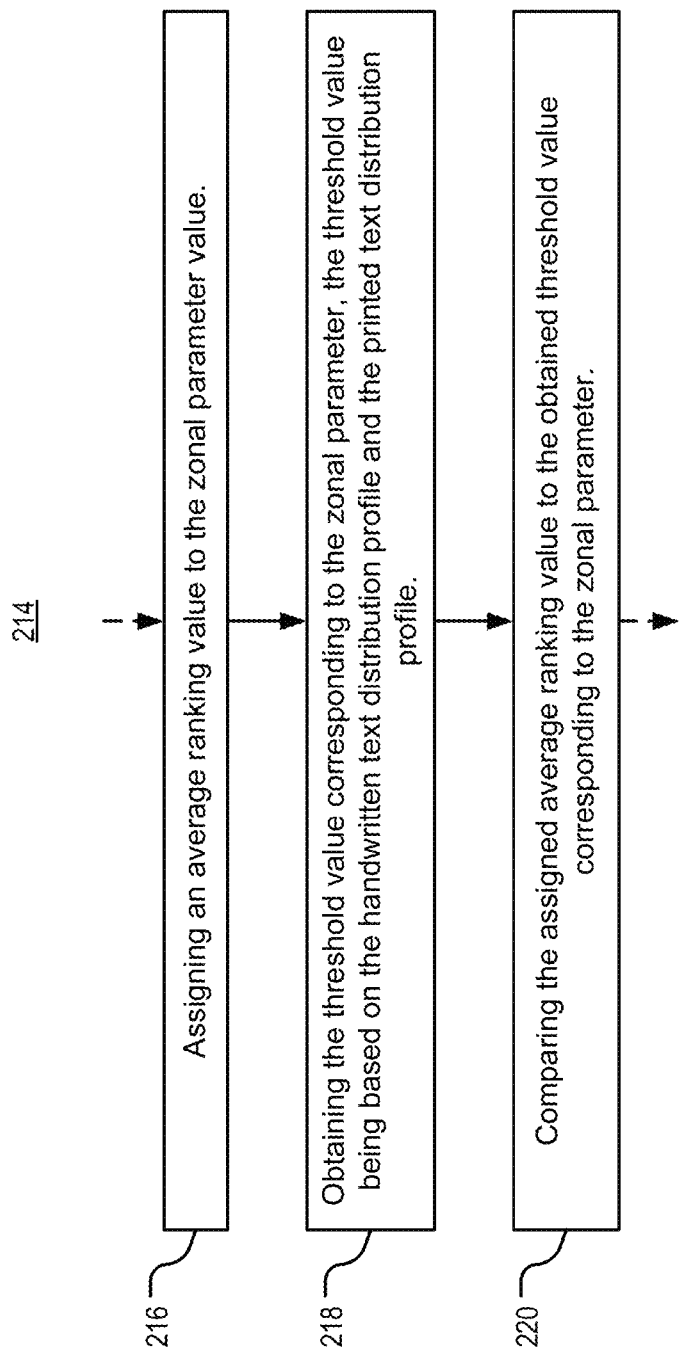
FIG. 2C is a flow chart illustrating a sub process of a character recognition method according to an embodiment of the present disclosure.

With reference again to the Figures, FIG. 2A, FIG. 2B, and FIG. 2C are flow diagrams illustrating a method of character recognition by character recognition system 100, according to an exemplary embodiment of the present disclosure. The method may begin when a digital document 104 is received by classifier server device 108 from user device 102(1) of a plurality of user devices 102(1)-102(n). User devices 102(1)-102(n) may be scanners, fax machines, cameras or other similar devices. In an embodiment, digital document 104 may be generated by user device 102(1) by converting a physical document (e.g. a page including handwritten text, printed text, and/or graphics) into digital document 104 or by creating digital document 104 in any format such as pdf, image, word, or other digital formats known to a person skilled in the art.

In an embodiment, digital document 104 may be received from user devices 102(1)-102(n). Further, digital document 104 may be generated by user devices 102(1)-102(n).

At step 202 of method 200, classifier server device 108 receives a request for character recognition of a digital document 104 from user device 102(1). In an embodiment, a user may use a user interface displayed on user device 102(1) to upload a digital document 104 to classifier server device 108 and further may select a button on the user interface of user device 102(1) to transmit a request to classifier server device 108 to initiate a character recognition process of the digital document 104. Classifier server device 108 receives the digital document 104 along with instructions to initiate a character recognition process of the digital document 104. Accordingly, upon receiving the digital document 104, classifier server device 108 initiates the character recognition process by performing segmentation on the digital document 104, as explained below at step 204 of method 200.

In an embodiment, classifier server device 108 receives a request for character recognition to convert the digital document 104 into a selectable document from any of user devices 102(1)-102(n).

In an embodiment, the digital document 104 may be a document that includes a text zone and a non-text zone. The text zone may include handwritten text and/or printed text, although any other type of textual data may also be included. The non-text zone may include a graphic zone, a magnetic ink character recognition (MICR), a machine-readable zone (MRZ), an optical mark recognition (OMR), pictures, figures, drawings, and/or tables, although any other type of non-textual data may also be included.

In an embodiment, the digital document 104 may be a document that includes handwritten text. In an embodiment, the digital document 104 may be a document that includes printed text. In an embodiment, the digital document 104 may be a document that includes handwritten text and printed text.

In an embodiment, and by way of a simple example, this digital document 104 may be a single page including the contents of a business letter. In this way, the single page includes a logo, a salutation, a body, and a signature.

At step 204 of method 200, classifier server device 108 segments the digital document 104 into a plurality of zones by applying one or more segmentation algorithms to the digital document 104. The one or more segmentation algorithms can include classical computer vision based approaches or artificial intelligence-based approaches. The one or more segmentation algorithms may deploy semantic segmentation or instance segmentation. Further, the one or more segmentation algorithms may include threshold segmentation, edge detection segmentation, k-means clustering, and a region-based convolutional neural network. It can be appreciated that method 200 may similarly be implemented such that the digital document 104 received at step 202 is previously segmented by another software program, device, or method.

In an embodiment, the one or more segmenting algorithms may include region based segmenting algorithms, edge based segmenting algorithms, threshold and color based segmenting algorithms, and/or an object analysis based segmenting algorithm, although any other segmenting algorithm may also be included. Region based segmenting algorithms may include but are not limited to watershed and region growing segmenting algorithms. Edge based segmenting algorithms may include but are not limited to edge detection and active contours algorithms. Threshold and color based segmenting algorithms may include but are not limited to Otsu, multi-level colors, fixed threshold, adaptive threshold, dynamic threshold, and/or automatic threshold algorithms. The object analysis based segmenting algorithm is further explained below.

In an embodiment, classifier server device 108 utilizes the object analysis based segmenting algorithm to extract all objects from the digital document 104. The objects (for example, horizontal lines, vertical lines, text objects, graphic objects, etc.) are first detected within the digital document 104 by classifier server device 108. In an embodiment, classifier server device 108 classifies the detected objects as non-text objects and text objects. The text objects may include characters (e.g. handwritten characters, printed characters), numbers (e.g. handwritten numbers, printed numbers), letters (e.g. handwritten letters, printed letters) etc. The non-text objects may include horizontal lines, vertical lines, graphic objects, etc.

To this end, the text objects may be divided into a plurality of blocks by classifier server device 108. A block, for example, may be any grouping of characters (e.g., a single character such as a letter or a number, a word, a sentence, a paragraph, etc.). A block may be differentiated from another block based on whether the distance therebetween may be greater than a predetermined distance. For example, the distance between two paragraphs may be much greater than the distance between two characters in a word. Accordingly, such distance may be used in determining the size of a block. In one embodiment, each block may be of a different size. In one embodiment, some block(s) may be of the same size while other block(s) may be of different size(s). In one embodiment, the minimum distance between blocks may be two times the size of a character, while the distance between characters may be less than or equal to 0.2 times the size of the character. The above-defined distances provide a relationship between characters that can be implemented in a variety of measurement systems such as pixels. In an embodiment, the text objects are divided into blocks based on height and stroke width corresponding to the text objects by classifier server device 108. For example, characters with the same height and stroke width are grouped together to form a text group. By way of example, a text group may include a word, a sentence, a paragraph, etc. Accordingly, each text group including characters with the same height and stroke width are referred to as a unique text zone. The non-text objects can then be processed by classifier server device 108 in a way similar to text objects. By way of example, classifier server device 108 utilizes the object analysis based segmenting algorithm to extract all non-text objects from digital document 104. The non-text objects (for example, horizontal lines, vertical lines, graphic objects, etc.) are detected within digital document 104. In an embodiment, classifier server device 108 groups each of the non-text objects in non-text groups. By way of example, classifier server device 108 determines if the intersection of horizontal lines and vertical lines forms a table and identifies the table as a unique non-text zone. Further, if it is determined that the horizontal lines and vertical lines do not form a table, then each horizontal line and each vertical line is determined as a unique non-text zone by classifier server device 108. The classifier server device 108 utilizes the object analysis based segmenting algorithm and identifies graphic objects such as, but not limited to, pictures, drawings, etc. each as a unique non-text zone. Each graphic group may be determined as a unique non-text zone by classifier server device 108. In an embodiment, a text object may include characters (e.g. handwritten characters, printed characters), numbers (e.g. handwritten numbers, printed numbers), letters (e.g. handwritten letters, printed letters), etc. A text block, for example, may be any grouping of characters (e.g., a single character such as a letter or a number, a group of words, a group of sentences, a group of paragraphs, etc.). Further, a grouping of characters with the same height and stroke width (e.g., a single character such as a letter or a number, a group of words that includes characters of the same height and stroke width, a group of sentences that includes words with the same height and stroke width, a group of paragraphs that includes sentences with the same height and stroke width, etc.) together form a text group. Accordingly, each text group may be determined by classifier server device 108 as a unique text zone.

Further to the above, segmenting algorithms may include machine learning algorithms that are trained to segment documents. The machine learning algorithms may include a neural network algorithm trained to segment documents, a convolutional neural network algorithm trained to segment documents, a deep learning algorithm trained to segment documents, and a reinforcement learning algorithm trained to segment documents, although any other neural network algorithm trained to segment documents may also be included.

Subsequently, at step 206 of method 200, the classifier server device 108 classifies each of the plurality of zones as text zones or non-text zones. The classification by the classifier server device 108 may be performed by known image classification techniques including but not limited to artificial neural networks (e.g., convolutional neural networks), linear regression, logistic regression, decision tree, support vector machine, random forest, naive Bayes, and k-nearest neighbor.

In an example, wherein the digital document 104 is a business letter, the digital document 104 can be segmented into at least four zones that are then classified. A first zone may be a text zone including a salutation of the business letter. A second zone may be a text zone including a body of the business letter. A third zone may be a text zone including a signature of the business letter. A fourth zone may be a non-text zone including a logo of the business letter. A fifth zone may be a non-text zone forming a remaining white space of the business letter.

At step 208 of method 200, classifier server device 108 calculates at least one parameter value for each text zone. In an embodiment, step 208 of method 200 may further include identifying text objects within each text zone and calculating the at least one parameter value for each identified text object. In an embodiment, the at least one parameter value may be based on, among others, extracted shapes of text objects, extracted dimensions and perimeters of text objects, stroke width of text objects, an assigned number of text objects, and a pixel information related to color and intensity. The at least one parameter value may also include, for each text zone, a curvature, a center of mass, image properties, and attributes of adjacent zones.

In an embodiment, the at least one parameter value may include dimensions and perimeter values associated with each of the text objects (i.e., an object dimension value and an object perimeter value), a color associated with each of the text objects, a contour associated with each of the text objects, an edge location associated with each of the text objects, an area associated with each of the text objects, a shape associated with each of the text objects, an object curvature value associated with each of the text objects, a center of mass value associated with each of the text objects, an object font stroke width associated with each of the text objects, an object height associated with each of the text objects, an object density value associated with each of the text objects, an object pixel color information (such as colors and intensities, etc.), a number of black pixels associated with each of the text objects, and/or an object pixel intensity associated with each of the text objects, among others, although any other type of parameter value may also be included. The at least one parameter value may also be referred to as one or more parameters. In an example, the object density associated with each of the text objects may be a ratio of a number of text objects in a text zone normalized by a zone width corresponding with the text zone associated with each of the text objects multiplied with a zone height corresponding with the text zone associated with each of the text objects.

In an embodiment, and as it relates to a given text object within a text zone, the at least one parameter value may include a height of the text object within the text zone and a font stroke width of the text object within the text zone. Further, the at least one parameter value may be a ratio of a height of the text object within the text zone and the font stroke width of the text object within the text zone.

Figure 5:
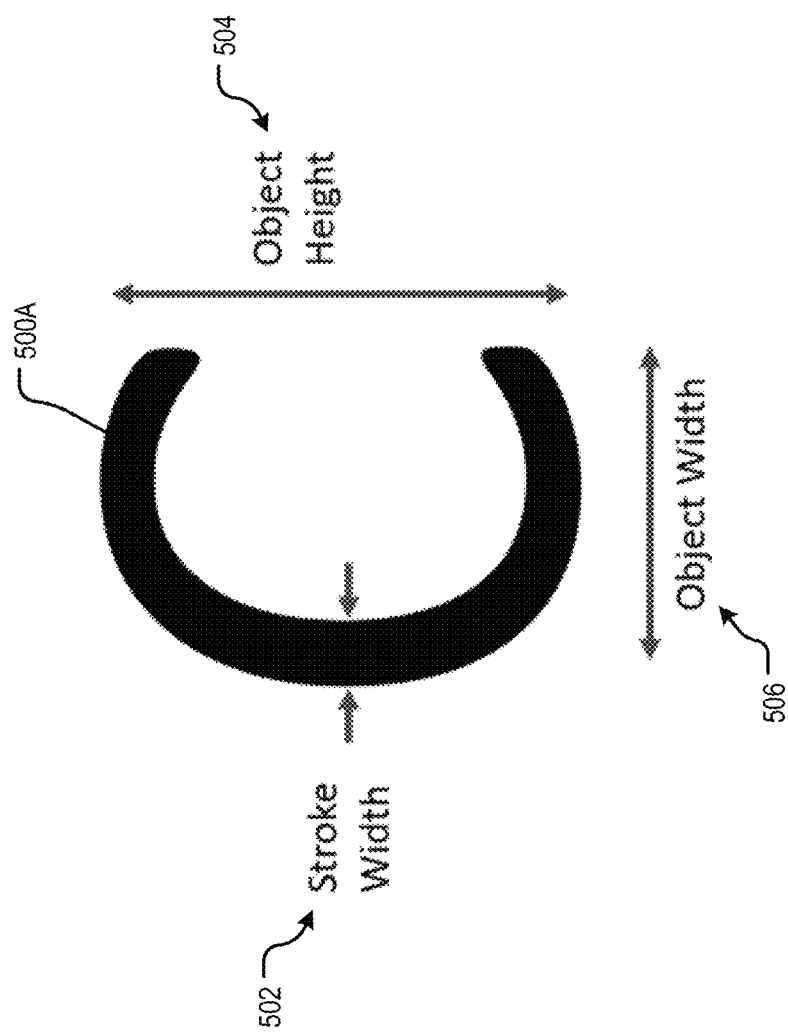
FIG. 5 illustrates an exemplary image of an object according to an embodiment of the present disclosure.

FIG. 5 provides an exemplary description of at least one parameter value that can be derived from a character within a text zone. FIG. 5 shows a letter character "C" that may be a text object 500A. Further, the at least one parameter value may be an object font stroke width of text object "C" 502, an object height of text object "C" 504, and/or an object width of text object "C" 506. In an embodiment, the font stroke width of text object "C" 502 may be calculated as $$\text{Object Font Stroke Width} = \frac{\text{Object Area}}{\text{Object Perimeter}} * 2 \quad (1)$$

wherein the object area may be a number of black pixels of text object "C" 500A.

Returning now to FIG. 2A through FIG. 2C, classifier server device 108 assigns, at step 210 of method 200, a ranking value to each calculated parameter value based on all parameter values calculated at step 208 of method 200 for the given text zone. In an embodiment, the ranking value may be an object ranking value of each text object within a given zone based on each other object ranking value of each other text object within the given zone (explained in detail below). The object ranking value of each of the text objects within, for instance, the first zone of the digital document 104 (i.e. salutation), may be assigned a value of between 0 and 15 based on object values associated with each of the text objects in the first zone. In other words, a text object of the first zone that has a lowest object value can be assigned an object ranking value of 0 while a text object of the first zone that has a highest object value may be assigned an object ranking value of 15. Multiple text objects may have the same object ranking value. Further, any other values for the range may also be included.

In the example described herein, the first zone may include the salutation of the letter. The salutation of the letter may be, for instance, "Hello World". An object ranking value for each text object of the salutation may be determined. In other words, each of "H", "e", "l", "l", "o", "W", "o", "r", "l", and "d" may be assigned an object ranking value. Based on the object value determination method described above, the text object "H" may be assigned an object ranking value of 11 and the text object "o" may be assigned an object ranking value of 4. It should be appreciated that such object ranking values are merely illustrative and are not intended to reflect run-time valuations.

At step 212 of method 200, classifier server device 108 determines at least one zonal parameter value of each text zone. In an embodiment, the at least one zonal parameter value may correspond to an average value of the at least one parameter value calculated at step 208 of method 200. In an embodiment, and for a given text zone, the at least one zonal parameter value may be determined as, among others, a density of text objects within the text zone, an average of dimension ratios for text objects within the text zone, context homogeneity, and a calculation (e.g., average) based on zonal pixel information such as color, area, contour, edges, and text objects contained therein.

In an embodiment, and as it relates to a single text zone, the at least one zonal parameter value of a text zone may be an average of dimension ratios for each text object within the text zone. For instance, each dimension ratio may be a comparison of a text object height to a text object stroke width.

At sub process 212 of method 200, and assuming that only one zonal parameter value is considered for each text zone of the digital document, a relationship between the zonal parameter value and a threshold value can be identified in order to aid in the classification of the text zone as a handwritten text zone or as a printed text zone, as will be described with reference to FIG. 2C.

At step 216 of sub process 214 of FIG. 2C, an average ranking value can be assigned to the zonal parameter value, determined at step 212 of method 200. The average ranking value can be assigned in a similar manner to the ranking values of step 210 of method 200.

At step 218 of sub process 214, the threshold value can be identified by probing distribution profiles associated with each of handwritten text and printed text. In other words, the threshold value is identified from reference data as a value, such as a ranking value, above which a given text zone is most likely going to be a handwritten text zone and below which the given text zone is most likely going to be a printed text zone. The phrase 'most likely' reflects a level of confidence based on how the distribution profiles are related to each other, the level of confidence allowing the given text zone to be subsequently classified as either of a handwritten text zone or a printed text zone.

In an embodiment, the threshold value can be obtained from a reference table, such as a look up table, comprising threshold values based on a type of zonal parameter value. To this end, the threshold values within the reference table may be based on distribution profiles generated for each type of zonal parameter value and may be calculated in real-time, may be previously calculated, or may be calculated by a third-party and may be based on reference data associated with 'labeled' text zones, wherein the 'labeled' text zones include those that have been previously identified as being either handwritten text or printed text.

In an embodiment, each of the handwritten text distribution profile and the printed text distribution profile can be generated by classifier server device 108 or can be obtained from a local storage device or a remote storage device and can be based on reference data corresponding to each of handwritten text and printed text. Each distribution profile, moreover, can be based on a specific zonal parameter value being evaluated. Therefore, if the parameter value of the zone is object aspect ratio, for example, each of the handwritten text distribution profile and the printed text distribution profile used to determine a relevant threshold value can be based on the object aspect ratio.

Generally, the handwritten text distribution profile can be a distribution curve based on a histogram of samples of reference data and associated ranking values. The reference data may be, for instance, sample text zones that have been classified as handwritten text. In an embodiment, the reference data may be based on zonal parameter values having associated ranking values. For instance, the zonal parameter value may be object density. In an embodiment, the reference data may be based on parameter values of each object within the sample text zones, wherein each of the sample text zones includes objects and the like that have calculated parameter values and, subsequently, assigned ranking values. For instance, the calculated parameter values may be an object stroke width. As such, in the event object parameter values are used, each pair of calculated parameter values and assigned ranking values, from each of the sample text zones, can be used to populate a histogram. In the event zonal parameter values are used, each pair of zonal parameter values and assigned ranking values, from each of the sample text zones, can be used to populate a histogram. In other words, the histogram can be populated by, for each ranking value, counting the number of handwritten text sample text zones having the same ranking value. A distribution curve, referred to herein as the handwritten text distribution profile, can then be generated from the histogram by normalizing the histogram values by a total number of the handwritten text sample text zones.

Similarly, the printed text distribution profile can be a distribution curve based on a histogram of samples of reference data and associated ranking values. The reference data may be, for instance, sample text zones that have been classified as printed text. In an embodiment, the reference data may be based on zonal parameter values having associated ranking values. For instance, the zonal parameter value may be object density. In an embodiment, the reference data may be based on parameter values of each object within the sample text zones, wherein each of the sample text zones includes objects and the like that have calculated parameter values and, subsequently, assigned ranking values. For instance, the calculated parameter values may be an object stroke width. As such, in the event object parameter values are used, each pair of calculated parameter values and assigned ranking values, from each of the sample text zones, can be used to populate a histogram. In the event zonal parameter values are used, each pair of zonal parameter values and assigned ranking values, from each of the sample text zones, can be used to populate a histogram. In other words, the histogram can be populated by, for each ranking value, counting the number of printed text sample text zones having the same ranking value. A distribution curve, referred to herein as the printed text distribution profile, can then be generated from the histogram by normalizing the histogram values by a total number of the printed text sample text zones.

Figure 3:
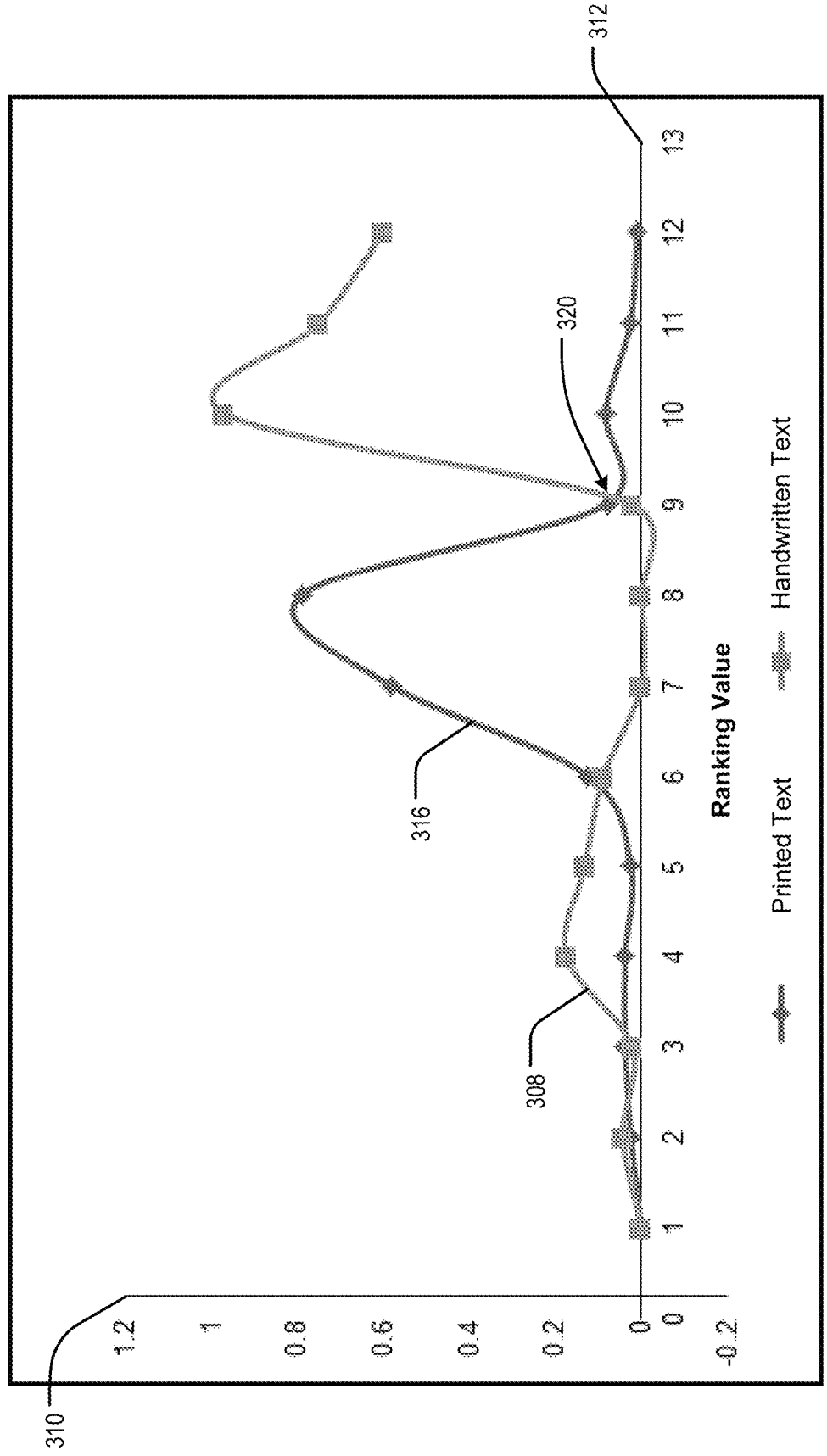
FIG. 3 is a figure illustrating distribution function curves, according to an embodiment of the present disclosure.

In an embodiment, the printed text distribution profile and the handwritten text distribution profile can be as depicted in FIG. 3. A handwritten text distribution profile 308 and a printed text distribution profile 316 are shown. A horizontal axis 312 defines an object ranking value while a vertical axis 310 defines a probability of observing a given ranking value in a handwritten text zone or in a printed text zone. The handwritten text distribution profile 308 and the printed text distribution profile 316 may each have been generated for and correspond to a parameter value at issue. An intersection 320 can be, as in step 218 of sub process 214, identified as the threshold value. In other words, the intersection 320 defines a ranking value as the threshold value.

In an embodiment, the intersection 320 of the handwritten text distribution profile 308 and the printed text distribution profile 316 can be selected as an intersection of the distribution profiles that maximizes an area under the curve. In theory, and as it relates to FIG. 3, a prediction X follows a probability density function e.g. the handwritten text distribution profile 308) if the prediction actually belongs to class "positive/handwritten", and FM (e.g. the printed text distribution profile 316) if otherwise. Therefore, the true positive rate is given by the area under the handwritten text distribution profile 308 above the threshold value T defined by the intersection 320. In other words, the true positive rate is the sum of the values of the handwritten text distribution profile 308 that are greater than the intersection 320, multiplied by the distances between them. While the true negative rate is given by the area under the printed text distribution curve, which is the sum of the printed text distribution curve values that are less than the threshold value T multiplied by the distances between them. The threshold value T of the present disclosure may be the intersection that maximizes the true positive rate and the true negative rate.

In practice, the area under the curve for each distribution profile is located on opposite sides of the intersection. In practice, and as shown in FIG. 3, the maximized area under the curve for each distribution profile is realized at the intersection 320 defined by ranking value '9'. Relative to ranking value '9', the area under the curve of the handwritten text distribution profile 308 to the right of '9' is maximized at the same time the area under the curve of the printed text distribution profile 316 to the left of '9' is maximized. Other points of intersection between the two distribution profiles, such as ~3, do not result in the above-described maximized area under the curve, and so are not chosen.

Returning now to FIG. 2C, at step 220 of sub process 214, the assigned average ranking value can be compared to the threshold value obtained at step 218 of sub process 214. With brief reference to FIG. 3, the comparison may be a binary classification type problem, wherein the average ranking value can be evaluated to determine whether it is greater than or less than the threshold value. Generally, in binary classification, the class prediction for each instance is often made based on a variable X, which is a "score" computed for that instance. Given a threshold value T, e instance is classified as "positive" if X>T, and "negative" otherwise.

Accordingly, based on the comparison and with reference again to FIG. 2B, classifier server device 108 classifies the text zone as either one of a handwritten text zone or a printed text zone at step 222 of method 200 or step 224 of method 200, respectively.

In the event the comparison at step 220 of sub process 214 indicates the ranking value of the text zone is greater than the threshold value, the text zone is classified as a handwritten text zone at step 222 of method 200 and is assigned an identifier indicating that the zone is a handwritten text zone. The identifier may be, for instance, a piece of software code inserted into the text zone to indicate that the text zone is a handwritten text zone.

In the event the comparison at step 220 of sub process 214 indicates the ranking value of the text zone is less than the threshold value, the text zone is classified as a printed text zone at step 222 of method 200 and is assigned an identifier indicating that the zone is a printed text zone. The identifier may be, for instance, a piece of software code inserted into the text zone to indicate that the text zone is a printed text zone.

Accordingly, at step 226 of method 200, classifier server device 108 generates a modified version of the digital document 104, the modified version of the digital document 104 including identifiers assigned to text zones thereof.

Figure 4:
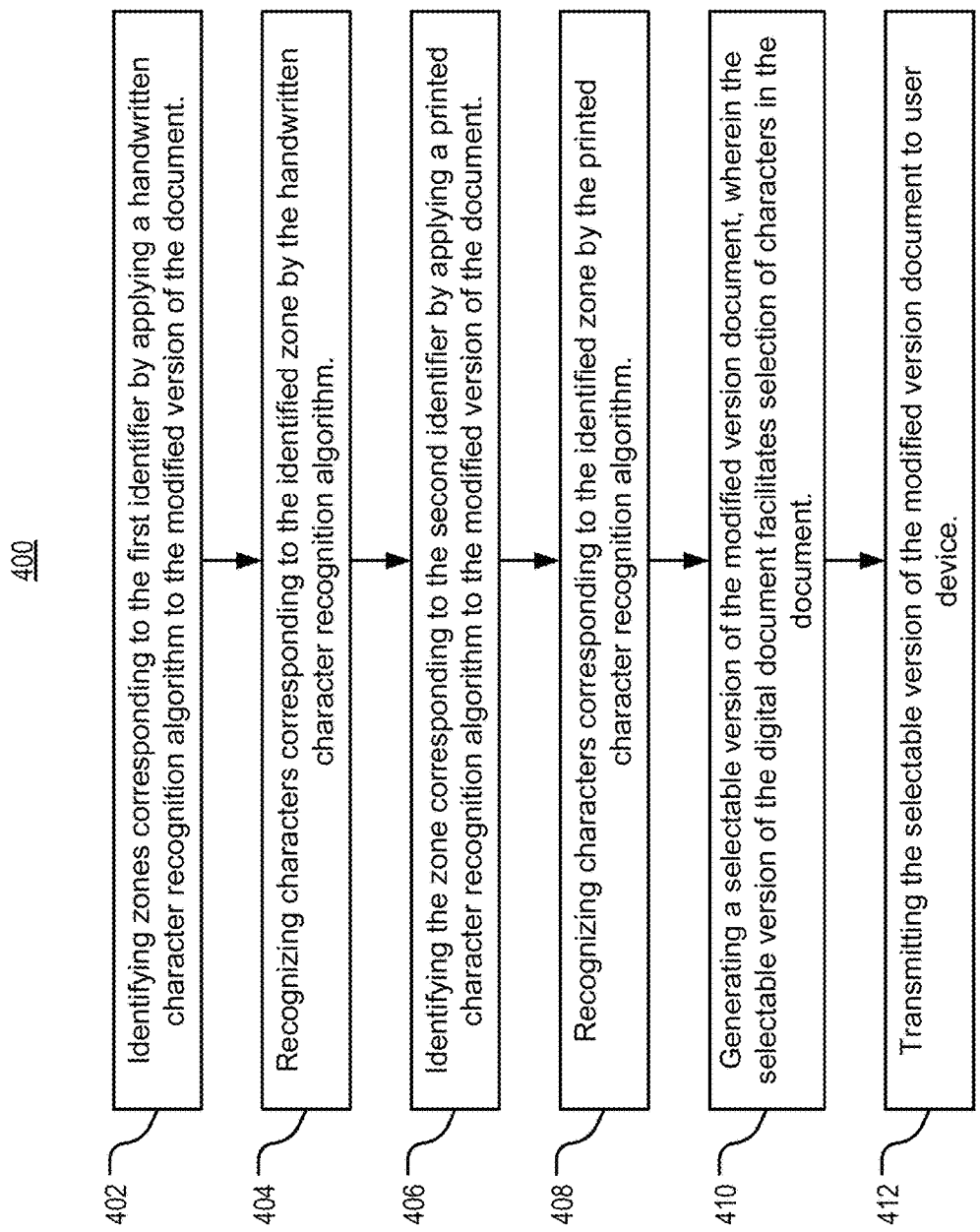
FIG. 4 is a flow chart illustrating generating a selectable version of a document based on the character recognition process according to an embodiment of the present disclosure.

After having modified the digital document 104 by the methods of FIG. 2A through FIG. 2C, the modified digital document can be processed according to method 400 of FIG. 4. For illustrative purposes, it can be assumed that the modified digital document includes four text zones, two of which have been classified as handwritten text zones and assigned a corresponding first identifier indicating the same, and two of which have been classified as printed text zones and assigned a corresponding second identifier indicating the same.

FIG. 4 is a flow chart illustrating a method 400 for generating a selectable version of a document based on the character recognition process according to an embodiment of the present disclosure. The method starts by accessing a modified version of the digital document 104 stored in the database storage device 110. In an embodiment, the modified version of the digital document 104 may be stored previously by classifier server device 108 at step 226 of method 200 of FIG. 2B. In an embodiment, the modified version of the digital document 104 may be received by classifier server device 108 from user device 102(1) and/or may be stored locally at classifier server device 108. In an embodiment, the modified version of the digital document 104 may be generated by user device 102(1) and stored on database storage device 110.

In an embodiment, the modified version of the digital document 104 may be received by classifier server device 108 from user devices 102(1)-102(n) and/or may be stored locally at classifier server device 108. In an embodiment, the modified version of the digital document 104 may be generated by user devices 102(1)-102(n) and stored on database storage device 110.

At step 402 of method 400 of FIG. 4, classifier server device 108 identifies the first identifiers assigned to corresponding text zones. At step 404 of method 400, classifier server device 108 determines that the first identifiers are identifiers for handwritten text zones and thus identifies that an ICR algorithm is to be applied to recognize text in the handwritten text zones. Accordingly, classifier server device 108 applies the ICR algorithm to the handwritten text zones in the modified version of the digital document 104. Similarly, at step 406 of method 400, classifier server device 108 identifies the second identifiers assigned to corresponding text zones. At step 408 of method 400, classifier server device 108 determines that the second identifiers are identifiers for printed text zones and thus identifies that an OCR algorithm is to be applied to recognize text in the printed text zones. Accordingly, classifier server device 108 applies the OCR algorithm to the printed text zones in the modified version of the digital document 104.

Next, the classifier server device 108 generates a selectable version of the digital document 104 at step 410 of method 400 based on the identified and recognized text zones. The selectable version of the digital document 104 facilitates selection of text objects thereof by user devices 102(1)-102(n). The selectable version of the digital document 104 includes the handwritten characters and the printed characters that are selectable by user devices 102(1)-102(n). The selectable version of the digital document 104 may then, optionally, be transmitted to a user device at step 412 of method 400. For instance, the selectable version of the digital document 104 may be transmitted to any of the user devices 102(1)-102(n). User devices 102(1)-102(n) may apply a handwritten character recognition algorithm previously stored on user devices 102(1)-102(n) to all the zones in the modified version of the digital document 104. In this embodiment, the handwritten character recognition algorithm identifies the zones corresponding to the first identifier inserted in the modified version of the document 104. Upon identifying the zones corresponding to the first identifier and to the second identifier, the handwritten character recognition algorithm recognizes characters corresponding to those zones that are assigned the first identifier and the printed character recognition algorithm recognizes characters corresponding to those zones that are assigned the second identifier. Thus, the handwritten characters and the printed characters are then converted to be selectable by user devices 102(1)-102(n) via user interfaces corresponding to user devices 102(1)-102(n).

An advantage of classifying text zones as either handwritten text zones or printed text zones is that classifier server device 108 may utilize the ICR algorithm to recognize characters in handwritten text zones of the digital document 104 and, separately, the OCR algorithm to recognize characters in printed text zones of the digital document 104. Thus, each recognition algorithm can be efficiently applied based on the demands of a given text zone, as indicated by an assigned identifier.

Appreciating that neither of a handwritten character recognition algorithm (e.g., the above-described ICR) nor an OCR algorithm for printed text objects is applied to all the zones in the entire digital document 104, the present disclosure provides the technical advantage of efficiently processing a document by only applying the ICR algorithm to specific zones of a document. This technology does not apply both the ICR and OCR algorithms to every zone in the entire digital document 104 to recognize handwritten characters and printed characters and as all the characters in the entire document are not processed by both of the ICR algorithm and the OCR algorithm, this technology significantly reduces the time required to analyze all the characters of the digital document. Thus, this technology provides the advantage of recognizing characters of a document only once to provide a fast process of character recognition which is highly efficient, especially in an environment where a high volume of characters are to be processed.

Accordingly, the present disclosure achieves more accurate and robust results as well as saves computational resources/processing power as the entire document (all the zones) does not have to be processed by both the handwritten character recognition algorithm (e.g., ICR) and the printed character recognition algorithm (for example, OCR).

In an embodiment, the classifier server device 108 may perform operations associated with FIG. 2A through FIG. 2C based on the below situations, sequentially, randomly, or in combination with each other, before reaching step 226 of method 200.

In a first situation, according to an embodiment, the at least one parameter value may be a ratio of the object height to object font stroke width and the classifier server device 108 may determine a zonal parameter value as an average of the ratio of object height to object font stroke width. When the zonal parameter value exceeds the threshold value, the classifier server device 108 determines all objects within that zone to be handwritten text objects and performs step 222 of method 200 to classify the text zones as a handwritten text zone. Conversely, when the zonal parameter value does not exceed the threshold value, the classifier server device 108 determines all objects within that zone to be printed text objects and performs step 224 of method 200 to classify the text zones as printed text zones.

In a second situation, when the zonal parameter value may be an object density, the classifier server device 108 determines, as the zonal parameter value, an average object density based on the ratio of number of objects in a text zone to a multiplication of text zone width and text zone height. When the zonal parameter value exceeds the threshold value, the classifier server device 108 determines all objects within that text zone to be handwritten text objects and performs step 222 of method 200 to classify the text zones as handwritten text zones. Conversely, when the zonal parameter value does not exceed the threshold value, the classifier server device 108 determines all objects within that text zone to be printed text objects and performs step 224 of method 200 to classify the text zones as printed text zones.

In a third situation, classifier server device 108 identifies text zones that have been classified as handwritten text zones during the above-described first situation and second situation and labels the text zones as confident handwritten text zones.

In a fourth situation, classifier server device 108 identifies text zones that have been classified as printed text zones during the above-described first situation and second situation and labels the text zones as confident printed text zones.

In a fifth situation, classifier server device 108, in view of the above-described third situation and fourth situation, identifies non-confident text zones. The non-confident text zones are those text zones that have not been classified as handwritten text zones during either of the first situation and the second situation as well as those text zones that have not been classified as printed text zones during either of the first situation and the second situation. Thus, upon identifying the non-confident zones, classifier server device 108 identifies neighboring zones surrounding each of the non-confident zones. Upon identifying the neighboring zones surrounding the non-confident zones, classifier server device 108 assesses if a majority of the neighboring zones are confident handwritten text zones. Upon determining that the majority of the neighboring zones are confident handwritten text zones, classifier server device 108 labels the non-confident zones as confident handwritten text zones. However, when it is determined that the majority of the neighboring zones are not confident handwritten text zones, classifier server device 108 labels the non-confident zones as confident printed text zones.

Figure 6:
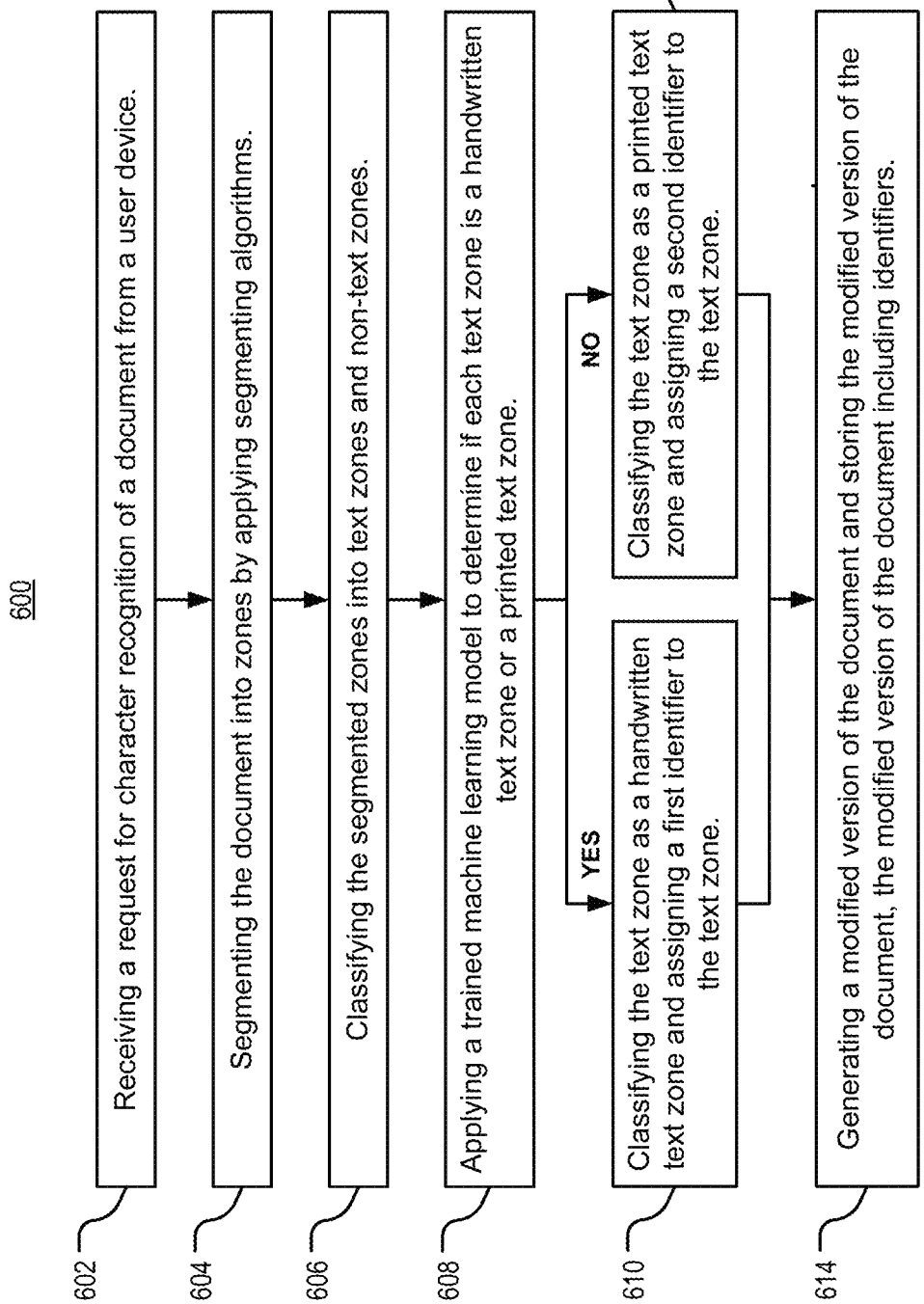
FIG. 6 is a flow chart illustrating a character recognition method using a trained machine learning algorithm according to an embodiment of the present disclosure.

FIG. 6 is a flow chart illustrating a method of character recognition by character recognition system 100 using a trained machine learning algorithm according to an embodiment of the present disclosure. The method is initiated upon receipt of digital document 104 by classifier server device 108 from user device 102(1). The digital document 104 may be generated by user device 102(1) by converting a physical document (e.g. a page including text and/or graphics) into the digital document 104 or by creating digital document 104 in any format such as pdf, image, word, or other digital formats known to a person skilled in the art.

In an embodiment, digital document 104 may be received from any of user devices 102(1)-102(n). Further, digital document 104 may be generated by any of user devices 102(1)-102(n).

In an embodiment, classifier server device 108 trains the machine learning algorithm by utilizing training test data and training results data previously stored in classifier server device 108 and/or by accessing training test data and training results data stored at database storage device 110. The training test data includes a set of digital documents, and each of the documents includes text zones. Further, the training results data includes classification results associated with each of documents in the set of digital documents included in the training test data. The training results data stores classification results corresponding with the actual classification of the zone (either being classified as a handwritten text zone or a printed text zone) in the documents of the set of digital documents.

Classifier server device 108 performs the training of the machine learning algorithm by classifying the training test data based on operations explained in FIG. 2A through FIG. 4. Upon classifying the training test data by classifier server device 108, classifier server device 108 utilizes the machine learning algorithm to verify if the classification performed on the training test data is accurate. The verification of the classification on the training test data is performed by comparing the results of the classification of the zones included in the set of documents of the training test data with the classification results of the corresponding zones included in the training results data.

Based on the comparison, if classifier server device 108 determines that the results are inaccurate, classifier server device 108 trains the machine learning algorithm to identify the inaccuracy and, accordingly, make accurate classification predictions in the future. Further, based on the comparison, if classifier server device 108 determines that the results are accurate, classifier server device 108 trains the machine learning algorithm to identify the accuracy and to make similar accurate classification predictions in the future.

At step 602 of method 600, classifier server device 108 receives a request for character recognition of digital document 104 from user device 102(1). In an embodiment, a user may use a user interface displayed on user device 102(1) to upload digital document 104 to classifier server device 108 and further may select a button on the user interface of user device 102(1) to transmit a request to classifier server device 108 to initiate a character recognition process of the digital document 104. Classifier server device 108 receives the digital document 104 along with the instructions to initiate a character recognition process on the digital document 104. Accordingly, upon receiving the digital document 104, classifier server device 108 initiates the character recognition process by performing segmentation on digital document 104, as explained in step 604 below.

In an embodiment, classifier server device 108 receives a request for character recognition of digital document 104 from any of user devices 102(1)-102(n).

In an embodiment, digital document 104 may be a document that includes a text zone and a non-text zone. The text zone may include handwritten text and/or printed text, although any other type of textual data may also be included. The non-text zone may include a graphic zone, a magnetic ink character recognition (MICR), a machine-readable zone (MRZ), an optical mark recognition (OMR), pictures, figures, drawings, and/or tables, although any other type of non-textual data may also be included.

In an embodiment, digital document 104 may be a document that includes handwritten text. In an embodiment, digital document 104 may be a document that includes printed text. In an embodiment, digital document 104 may be a document that includes handwritten text as well as printed text.

At step 604 of method 600, classifier server device 108 segments digital document 104 into a plurality of zones by applying one or more segmenting algorithms to digital document 104. This operation of segmenting the digital document 104 into a plurality of zones by applying one or more segmenting algorithm may be similar to step 204 of FIG. 2A, explained in detail above.

At step 606 of method 600, classifier server device 108 classifies each of the plurality of zones as text zones or non-text zones. The classification by the classifier server device 108 may be performed by known image classification techniques including but not limited to artificial neural networks (e.g., convolutional neural networks), linear regression, logistic regression, decision tree, support vector machine, random forest, naive Bayes, and k-nearest neighbor.

At step 608 of method 600, classifier server device 108 applies a trained machine learning algorithm that may be previously trained to analyze image pixels associated with each of the characters in a text zone to classify the text zones as a handwritten text zone or a machine printed text zone. The machine learning algorithms include a neural network algorithm trained to segment documents, a convolutional neural network algorithm trained to segment documents, deep learning algorithm trained to segment documents, and reinforcement learning algorithm trained to segment documents, although any other neural network algorithm trained to classify a zone as handwritten text zone or machine printed text zone may also be included.

Classifier server device 108 utilizes the machine learning algorithm to analyze each image pixel corresponding to each character of a text zone as input and determines if each character may be a handwritten character or a machine printed character. Upon determining that a character is a handwritten character, classifier server device 108 increments a first output pin value corresponding to the handwritten characters. Further, upon determining that a character is a machine printed character, classifier server device 108 increments a second output pin value corresponding to the machine printed characters.

Upon analyzing each image pixel corresponding to each character of a text zone, classifier server device 108 compares the first output pin value corresponding to the handwritten characters with the second output pin value corresponding to the machine printed characters. If the first output pin value corresponding to the handwritten characters has a value greater than the second output pin value corresponding to the machine printed characters, classifier server device 108 classifies the text zone as a handwritten text zone and method 600 proceeds to step 610. If the first output pin value corresponding to the handwritten characters has a value that is less than the second output pin value corresponding to the machine printed characters, the text zone may be classified as a machine printed text zone and method 600 proceeds to step 612.

At step 610 of method 600, classifier server device 108 classifies the text zone as a handwritten text zone and assigns an identifier to the text zone, as previously described with reference to FIG. 2A through FIG. 2C. The identifier may be a label that indicates that the text zone is a handwritten text zone. The identifier may be a piece of software code inserted into each text zone of the document 104 to indicate that the text zone may be a handwritten text zone.

At step 612 of method 600, classifier server device 108 classifier server device 108 classifies the text zone as a printed text zone and assigns an identifier to the text zone, as previously described with reference to FIG. 2A through FIG. 2C. The identifier may be a label that indicates that the text zone is a printed text zone. The identifier may be a piece of software code inserted into each text zone of the document 104 to indicate that the text zone may be a printed text zone.

At step 614 of method 600, classifier server device 108, upon performing the operations of classifying each of the text zones identified in the digital document 104 as either a handwritten text zone or a printed text zone, generates a modified version of the digital document 104 and stores the modified version of digital document 104 including the identifiers assigned to the text zones in database storage device 110 and/or stores the modified version of digital document 104 locally on classifier server device 108. This modified version of the digital document 104 including the identifiers may be further utilized as explained above in method 400 of FIG. 4.

In an embodiment, and as described with reference to step 608 of method 600, the classifier server device 108 receives, as input, contours of objects or characters corresponding to each of the text zones. The classifier server device 108 utilizes a machine learning algorithm to analyze the contours of each character of the text zone and determines if each character may be a handwritten character or a machine printed character. Classifier server device 108 determines if each character is a handwritten character, and for each character determined as a handwritten character, increments a first output pin value corresponding to the handwritten characters. Further, classifier server device 108 determines if each character is a printed character, and for each character determined as a machine printed character, increments a second output pin value corresponding to the machine printed characters.

Upon analyzing contours corresponding to each character of a text zone, classifier server device 108 compares the first output pin value corresponding to handwritten characters with the second output pin value corresponding to machine printed characters. Upon determining by classifier server device 108 that the first output pin value corresponding to handwritten characters has a value that may be more than the second output pin value corresponding to machine printed characters, classifier server device 108 classifies the zone as a handwritten text zone and method 600 proceeds to step 610, as explained above. Upon determining by classifier server device 108 that the first output pin value corresponding to handwritten characters has a value that may be less than the second output pin value corresponding to machine printed characters, classifier server device 108 classifies the zone as a machine printed text zone and method 600 proceeds to step 612, as explained above.

In an embodiment, the operations of FIG. 2A, FIG. 2B, FIG. 2C, FIG. 4, and FIG. 6 may be performed at classifier server device 108. In an embodiment, the operations of FIG. 2A, FIG. 2B, FIG. 2C, FIG. 4, and FIG. 6 may be performed by installing a software application (an "app") on user devices 102(1)-102(n) such that operations of FIG. 2A, FIG. 2B, FIG. 2C, and FIG. 4 are performed by the software application installed on user devices 102(1)-102(n) without communicating with any external network device.

In an embodiment, the operations of FIG. 2A, FIG. 2B, FIG. 2C, FIG. 4, and FIG. 6 may be performed by installing a software application on user devices 102(1)-102(n) such that operations of FIG. 2A, FIG. 2B, FIG. 2C, FIG. 4, and FIG. 6 are performed by the software application installed on user devices 102(1)-102(n) while communication with an external network device.

An advantage of classifying zones as handwritten text zones is that upon classifying the zone as a handwritten text zone, classifier server device 108 utilizes a handwritten character recognition algorithm that recognizes characters associated with those zones only that are classified as handwritten text zones. Thus, as the handwritten character recognition algorithm only recognizes characters associated with those zones that are classified as handwritten text zones and does not process all the characters in the entire document this provides an efficient method of recognizing characters. Further, upon classifying zones as printed text zones, classifier server device 108 applies a printed character recognition algorithm that recognizes characters associated with those zones only that are classified as printed text zones. Thus, as the printed character recognition algorithm only recognizes characters associated with those zones that are classified as printed text zones and does not process all the characters in the entire document, this provides an efficient method of recognizing characters.

As a handwritten character recognition algorithm is not applied to the entire document to identify handwritten characters, and further as a printed character recognition algorithm is not applied to the entire document to identify printed characters, the present disclosure provides the technical advantage of efficiently processing a document by only applying the handwritten character recognition algorithm or the printed character recognition algorithm to specific zones of a document instead of applying both to the entire document to recognize handwritten characters and printed characters respectively. Such technique achieves more accurate and robust results as well as saves computational resources/processing power as the entire document (all the zones) do not have to be processed by both the handwritten character recognition algorithm (for example, ICR) and the printed character recognition algorithm (for example, OCR).

Accordingly, as all the characters in the entire document are not processed by both of the ICR algorithm and the OCR algorithm, this technology significantly reduces the time required to analyze all the characters of the digital document. Thus, this technology provides the advantage of recognizing characters of a document only once to provide a fast process of character recognition which is highly efficient, especially in an environment where a high volume of characters are to be processed.

Each of the functions of the described embodiments may be implemented by one or more processing circuits (also referred as controller). A processing circuit includes a programmed processor (for example, a CPU 700 of FIG. 7), as a processor includes circuitry. A processing circuit may also include devices such as an application specific integrated circuit (ASIC) and circuit components arranged to perform the recited functions. The processing circuit may be a part of the classifier server device 108 as discussed in more detail with respect to FIG. 7.

Figure 7:
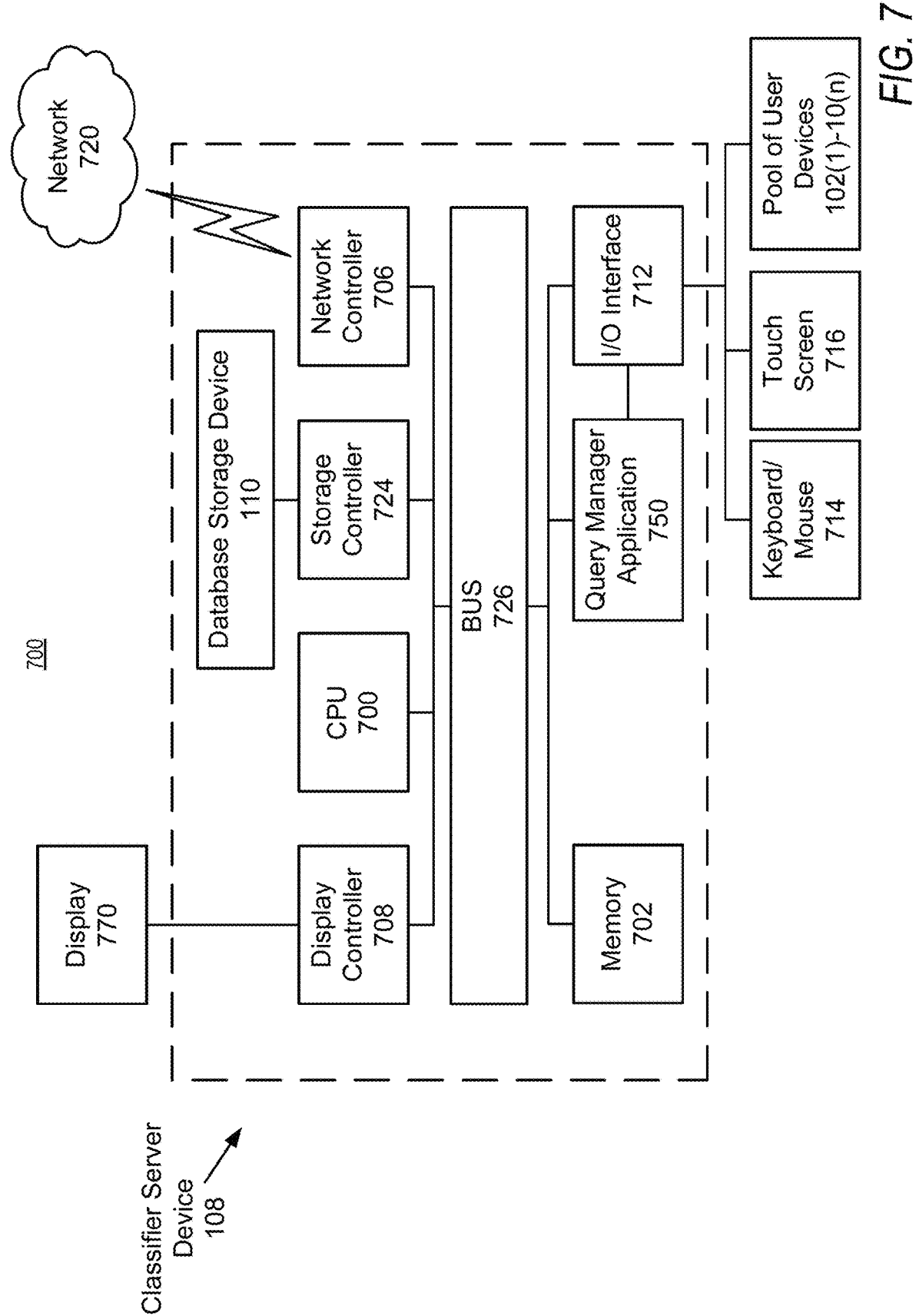
FIG. 7 is a detailed block diagram illustrating an exemplary classifier server according to certain embodiments of the present disclosure.

FIG. 7 is a detailed block diagram illustrating an exemplary classifier server device 108 according to certain embodiments of the present disclosure. In FIG. 7, the classifier server device 108 includes a CPU 700, and a query manager application 750. In an embodiment, the classifier server device 108 includes the database storage device 110 to be coupled to storage controller 724. In an embodiment, the database storage device 110 may be a separate individual (external) device and accessed by classifier server device 108 via network 720 (network 106 of FIG. 1).

The CPU 700 performs the processes described in the present disclosure. The process data and instructions may be stored in a memory 702. These processes and instructions (discussed with respect to FIG. 2A through FIG. 6) may also be stored on a storage medium disk 704 such as a hard drive (HDD) or portable storage medium or may be stored remotely.

Further, the discussed features of the present disclosure may be provided as a utility application, background daemon, or component of an operating system, or combination thereof, executing in conjunction with CPU 700 and an operating system such as Microsoft Windows or other versions, UNIX, Solaris, LINUX, Apple MAC-OS and other systems known to those skilled in the art.

The hardware elements in order to achieve the operations of classifier server device 108 may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art.

The classifier server device 108 in FIG. 7 also includes the network controller 706, such as an Intel Ethernet PRO network interface card from Intel Corporation of America, for interfacing with a network 720. As may be appreciated, the network 720 may be a public network, such as the Internet, or a private network such as an LAN or WAN network, or any combination thereof and may also include PSTN or ISDN sub-networks. Network 720 may also be wired, such as an Ethernet network, or may be wireless such as a cellular network including EDGE, 3G and 4G wireless cellular systems. The wireless network may also be WiFi, Bluetooth, or any other wireless form of communication that is known. Classifier server device 108 may communicate with external devices such as database storage device 110, the pool of user devices 102(1)-102(n), etc. via the network 720.

The classifier server device 108 further includes a display controller 708, such as a NVIDIA GeForce GTX or Quadro graphics adaptor from NVIDIA Corporation of America for interfacing with display 770. An I/O interface 712 interfaces with a keyboard 714 and/or mouse as well as a touch screen panel 716 and/or separate from display 770. Further, the classifier server device 108 may be connected to the pool of user devices 102(1)-102(n) via I/O interface 712 or through the network 720. Pool of user devices 102(1)-102(n) may send requests as queries that are handled by the query manager application 750 including extracting data from the database storage device 110 via the storage controller 724, from the memory 702, or trigger execution of processes discussed in FIG. 2A through FIG. 6.

The storage controller 724 connects the storage mediums with communication bus 726, which may be an ISA, EISA, VESA, PCI, or similar, for interconnecting all of the components of the classifier server device 108. A description of the general features and functionality of the display 770, keyboard and/or mouse 714, as well as the display controller 708, storage controller 724, network controller 706, and the I/O interface 712 is omitted herein for brevity as these features are known.

In one embodiment, classifier server device 108 of FIG. 7 may send a digital document 104 or receive a digital document 104, via the network 720, to/from pool of user devices 102(1)-102(n). Classifier server device 108 upon receiving the digital document 104 as part of a request to initiate a character recognition process stores the received digital document 104 in its memory 702. For example, pool of user devices 102(1)-102(n) may send, via the network 720, a modified version of the digital document 104 from the classifier server device 108 or the pool of user devices 102(1)-102(n) may receive, via the network 720, a selectable version of the modified document from the classifier server device 108 or a camera 809 of pool of user devices 102(1)-102(n) may capture an image of a physical document and transmit the image to the classifier server device 108. Pool of user devices 102(1)-102(n) may also perform one or more functions of classifier server device 108 on the hardware of one of the pool of user devices 102(1)-102(n), by way of example, user device 102(1), further illustrated in FIG. 8.

Figure 8:
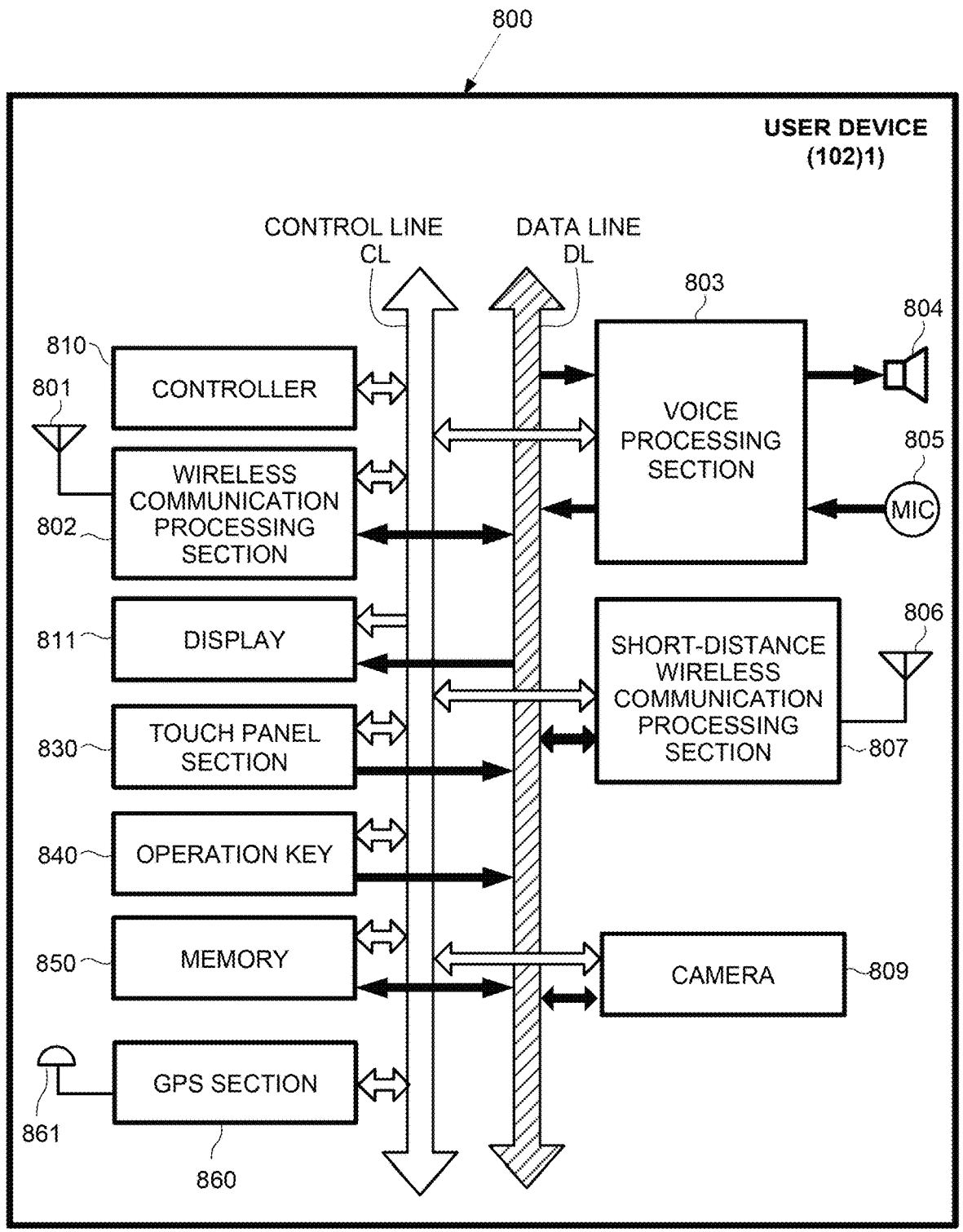
FIG. 8 is a detailed block diagram illustrating an exemplary user device according to certain embodiments of the present disclosure.

FIG. 8 is a detailed block diagram 800 illustrating an exemplary user device from the pool of user devices 102(1)-102(n), by way of example, FIG. 8 illustrates user device 102(1) according to certain embodiments of the present disclosure. In certain embodiments, the user device 102(1) may be a smartphone. However, the skilled artisan will appreciate that the features described herein may be adapted to be implemented on other devices (e.g., a laptop, a tablet, a server, an e-reader, a camera, a navigation device, etc.). The exemplary user device 102(1) includes a controller 810 and a wireless communication processing circuitry 802 connected to an antenna 801. A speaker 804 and a microphone 805 are connected to a voice processing circuitry 803.

The controller 810 may include one or more Central Processing Units (CPUs), and may control each element in the user device 102(1) to perform functions related to communication control, audio signal processing, control for the audio signal processing, still and moving image processing and control, and other kinds of signal processing. The controller 810 may perform these functions by executing instructions stored in a memory 850. For example, the processes illustrated in FIG. 2A, FIG. 2B, FIG. 3, FIG. 4, and FIG. 5 may be stored in the memory 850. Alternatively or in addition to the local storage of the memory 850, the functions may be executed using instructions stored on an external device accessed on a network or on a non-transitory computer readable medium.

The user device 102(1) includes a control line CL and data line DL as internal communication bus lines. Control data to/from the controller 810 may be transmitted through the control line CL. The data line DL may be used for transmission of voice data, display data, etc.

The antenna 801 transmits/receives electromagnetic wave signals between base stations for performing radio-based communication, such as the various forms of cellular telephone communication. The wireless communication processing circuitry 802 controls the communication performed between the user device 102(1) and other external devices such as the classifier server device 108 via the antenna 801. The wireless communication processing circuitry 802 may control communication between base stations for cellular phone communication.

The speaker 804 emits an audio signal corresponding to audio data supplied from the voice processing circuitry 803. The microphone 805 detects surrounding audio and converts the detected audio into an audio signal. The audio signal may then be output to the voice processing circuitry 803 for further processing. The voice processing circuitry 803 demodulates and/or decodes the audio data read from the memory 850 or audio data received by the wireless communication processing circuitry 802 and/or a short-distance wireless communication processing circuitry 807. Additionally, the voice processing circuitry 803 may decode audio signals obtained by the microphone 805.

The exemplary user device 102(1) may also include a display 811, a touch panel 830, an operation key 840, and a short-distance communication processing circuitry 807 connected to an antenna 806. The display 811 may be a Liquid Crystal Display (LCD), an organic electroluminescence display panel, or another display screen technology.

The touch panel 830 may include a physical touch panel display screen and a touch panel driver. The touch panel 830 may include one or more touch sensors for detecting an input operation on an operation surface of the touch panel display screen.

For simplicity, the present disclosure assumes the touch panel 830 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 830 may include transparent electrode touch sensors arranged in the X-Y direction on the surface of transparent sensor glass.

The operation key 840 may include one or more buttons or similar external control elements, which may generate an operation signal based on a detected input by the user. In addition to outputs from the touch panel 830, these operation signals may be supplied to the controller 810 for performing related processing and control. In certain aspects of the present disclosure, the processing and/or functions associated with external buttons and the like may be performed by the controller 810 in response to an input operation on the touch panel 830 display screens rather than the external button, key, etc. In this way, external buttons on the user device 800 may be eliminated in lieu of performing inputs via touch operations, thereby improving water-tightness.

The antenna 806 may transmit/receive electromagnetic wave signals to/from other external apparatuses, and the short-distance wireless communication processing circuitry 807 may control the wireless communication performed between the other external apparatuses. Bluetooth, IEEE 802.11, and near-field communication (NFC) are non-limiting examples of wireless communication protocols that may be used for inter-device communication via the short-distance wireless communication processing circuitry 807.

The user device 102(1) may include camera 809, which includes a lens and shutter for capturing photographs of the surroundings around the user device 102(1). In an embodiment, the camera 809 captures surroundings of an opposite side of the user device 102(1) from the user. The images of the captured photographs may be displayed on the display panel 811. Memory circuitry saves the captured photographs. The memory circuitry may reside within the camera 809 or it may be part of the memory 850. The camera 809 may be a separate feature attached to the user device 102(1) or it may be a built-in camera feature.

User device 102(1) may include an application that requests data processing from the classifier server device 108 via the network 720.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions may be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

While certain embodiments have been described, these embodiments have been presented by way of example only, and are not intended to limit the scope of the present disclosures.

Indeed, the novel methods, apparatuses and systems described herein may be embodied in a variety of other forms; furthermore, various omissions, substitutions and changes in the form of the methods, apparatuses and systems described herein may be made without departing from the spirit of the present disclosure. The accompanying claims and their equivalents are intended to cover such forms or modifications as would fall within the scope and spirit of the present disclosure. For example, this technology may be structured for cloud computing whereby a single function is shared and processed in collaboration among a plurality of apparatuses via a network.

The apparatus, method, and computer readable medium discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein may be embodied in hardware and/or software. Also, technology evolves and, thus, many of the elements are examples that do not limit the scope of the disclosure to those specific examples.

The methods, apparatuses, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein may be embodied in hardware and/or software. Also, technology evolves and, thus, many of the elements are examples that do not limit the scope of the disclosure to those specific examples.

Obviously, numerous modifications and variations are possible in light of the above teachings. It is therefore to be understood that within the scope of the appended claims, the present disclosure may be practiced otherwise than as specifically described herein.

Embodiments of the present disclosure may also be as set forth in the following parentheticals.

(1) A method of recognizing a character in a digital document, the method comprising classifying, by processing circuitry, a segment of the digital document as including text, calculating, by the processing circuitry, at least one parameter value associated with the classified segment of the digital document, determining, by the processing circuitry and based on the calculated at least one parameter value, a zonal parameter value, classifying, by the processing circuitry, the segment of the digital document as a handwritten text zone or as a printed text zone based on the determined zonal parameter value and a threshold value, the threshold value being based on a selection of an intersection of a handwritten text distribution profile and a printed text distribution profile, each of the handwritten text distribution profile and the printed text distribution profile being associated with a zonal parameter corresponding to the determined zonal parameter value, and generating, by the processing circuitry and based on the classifying, a modified version of the digital document.

(2) The method of (1), further comprising performing, by the processing circuitry and when the segment is classified as a handwritten text zone, handwritten character recognition on the segment to recognize the handwritten text, and performing, by the processing circuitry and when the segment is classified as a printed text zone, printed character recognition on the segment to recognize the printed text.

(3) The method of either (1) or (2), wherein the determined zonal parameter value is an object density value calculated by multiplying, by the processing circuitry, a segment ratio by a segment height, the segment ratio being a ratio of a number of objects in the segment to a segment width.

(4) The method of any one of (1) to (3), wherein the generating the modified version of the digital document includes assigning, by the processing circuitry and when the segment is classified as a handwritten text zone, a handwritten text identifier to the segment, and assigning, by the processing circuitry and when the segment is classified as a printed text zone, a printed text identifier to the segment.

(5) The method of any one of (1) to (4), further comprising generating, by the processing circuitry and as the modified version of the digital document, a first selectable version of the digital document, wherein the first selectable version of the digital document includes the recognized handwritten text within the segment.

(6) The method of any one of (1) to (5), further comprising generating, by the processing circuitry and as the modified version of the digital document, a second selectable version of the digital document, wherein the second selectable version of the digital document includes the recognized printed text within the segment.

(7) The method of any one of (1) to (6), further comprising obtaining, by the processing circuitry, the threshold value from a reference table comprising threshold values based on a type of the zonal parameter value, each of the threshold values being based on a corresponding handwritten text distribution profile and corresponding printed text distribution profile from a database, the corresponding handwritten text distribution profile being based on a histogram associated with text zones labeled as handwritten text, and the corresponding printed text distribution profile being based on a histogram associated with text zones labeled as printed text.

(8) The method of any one of (1) to (7), wherein each of the histograms are based on a comparison of a parameter value for an object within a labeled text zone and a corresponding ranking for the object, the corresponding ranking being based on the parameter value for the object and parameter values for each other object within the labeled text zone.

(9) The method of any one of (1) to (8), wherein the selection of the intersection of the handwritten text distribution profile and the printed text distribution profile includes maximizing, by the processing circuitry, an area under a curve for each of the handwritten text distribution profile and the printed text distribution profile, the threshold value being a value above which the segment is likely to be handwritten text.

(10) The method of any one of (1) to (9), wherein the classifying includes calculating, by the processing circuitry, a zonal ranking value based on the determined zonal parameter value and ranking values associated with each of the calculated at least one parameter value, and comparing, by the processing circuitry, the zonal ranking value to the threshold value, the segment of the digital document being classified as a handwritten text zone when the zonal ranking value satisfies the threshold value.

(11) A non-transitory computer-readable medium storing instructions which when executed by a computer, cause the computer to perform a method of recognizing a character in a digital document, the method comprising classifying a segment of the digital document as including text, calculating at least one parameter value associated with the classified segment of the digital document, determining, based on the calculated at least one parameter value, a zonal parameter value, classifying the segment of the digital document as a handwritten text zone or as a printed text zone based on the determined zonal parameter value and a threshold value, the threshold value being based on a selection of an intersection of a handwritten text distribution profile and a printed text distribution profile, each of the handwritten text distribution profile and the printed text distribution profile being associated with a zonal parameter corresponding to the determined zonal parameter value, and generating, based on the classifying, a modified version of the digital document.

(12) The non-transitory computer-readable medium of (11), further comprising performing, when the segment is classified as a handwritten text zone, handwritten character recognition on the segment to recognize the handwritten text, and performing, when the segment is classified as a printed text zone, printed character recognition on the segment to recognize the printed text.

(13) The non-transitory computer-readable medium of either (11) or (12), wherein the determined zonal parameter value is an object density value calculated by multiplying a segment ratio by a segment height, the segment ratio being a ratio of a number of objects in the segment to a segment width.

(14) The non-transitory computer-readable medium of any one of (11) to (13), wherein the generating the modified version of the digital document includes assigning, when the segment is classified as a handwritten text zone, a handwritten text identifier to the segment, and assigning, when the segment is classified as a printed text zone, a printed text identifier to the segment.

(15) The non-transitory computer-readable medium of any one of (11) to (14), further comprising generating, as the modified version of the digital document, a first selectable version of the digital document, wherein the first selectable version of the digital document includes the recognized handwritten text within the segment and the recognized printed text within the segment.

(16) The non-transitory computer-readable medium of any one of (11) to (15), further comprising obtaining the threshold value from a reference table comprising threshold values based on a type of the zonal parameter value, each of the threshold values being based on a corresponding handwritten text distribution profile and corresponding printed text distribution profile from a database, the corresponding handwritten text distribution profile being based on a histogram associated with text zones labeled as handwritten text, and the corresponding printed text distribution profile being based on a histogram associated with text zones labeled as printed text.

(17) The non-transitory computer-readable medium of any one of (11) to (16), wherein each of the histograms are based on a comparison of a parameter value for an object within a labeled text zone and a corresponding ranking for the object, the corresponding ranking being based on the parameter value for the object and parameter values for each other object within the labeled text zone.

(18) The non-transitory computer-readable medium of any one of (11) to (17), wherein the selection of the intersection of the handwritten text distribution profile and the printed text distribution profile includes maximizing an area under a curve for each of the handwritten text distribution profile and the printed text distribution profile, the threshold value being a value above which the segment is likely to be handwritten text.

(19) The non-transitory computer-readable medium of any one of (11) to (18), wherein the classifying includes calculating a zonal ranking value based on the determined zonal parameter value and ranking values associated with each of the calculated at least one parameter value, and comparing the zonal ranking value to the threshold value, the segment of the digital document being classified as a handwritten text zone when the zonal ranking value satisfies the threshold value.

(20) An apparatus for recognizing a character in a digital document, comprising processing circuitry configured to classify a segment of the digital document as including text, calculate at least one parameter value associated with the classified segment of the digital document, determine, based on the calculated at least one parameter value, a zonal parameter value, classify the segment of the digital document as a handwritten text zone or as a printed text zone based on the determined zonal parameter value and a threshold value, the threshold value being based on a selection of an intersection of a handwritten text distribution profile and a printed text distribution profile, each of the handwritten text distribution profile and the printed text distribution profile being associated with a zonal parameter corresponding to the determined zonal parameter value, and generate a modified version of the digital document based on the segment classification.

Thus, the foregoing discussion discloses and describes merely exemplary embodiments of the present disclosure. As will be understood by those skilled in the art, the present disclosure may be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A method comprising:
    determining, by processing circuitry and based on at least one parameter value associated with a segment of a digital document, a zonal parameter value;
    classifying, by the processing circuitry, the segment of the digital document as a handwritten text zone or as a printed text zone based on the determined zonal parameter value and a threshold value, the threshold value being based on a selection of an intersection of a handwritten text distribution profile and a printed text distribution profile, each of the handwritten text distribution profile and the printed text distribution profile being associated with a zonal parameter corresponding to the determined zonal parameter value; and
    generating, by the processing circuitry and based on the classifying, a modified version of the digital document.

2. The method of claim 1, further comprising
    performing, by the processing circuitry and when the segment is classified as a handwritten text zone, handwritten character recognition on the segment to recognize the handwritten text, and
    performing, by the processing circuitry and when the segment is classified as a printed text zone, printed character recognition on the segment to recognize the printed text.

3. The method of claim 1, wherein the determined zonal parameter value is an object density value calculated by
    multiplying, by the processing circuitry, a segment ratio by a segment height, the segment ratio being a ratio of a number of objects in the segment to a segment width.

4. The method of claim 1, wherein the generating the modified version of the digital document includes
    assigning, by the processing circuitry and when the segment is classified as a handwritten text zone, a handwritten text identifier to the segment, and
    assigning, by the processing circuitry and when the segment is classified as a printed text zone, a printed text identifier to the segment.

5. The method of claim 2, further comprising
generating, by the processing circuitry and as the modified version of the digital document, a first selectable version of the digital document, wherein the first selectable version of the digital document includes the recognized handwritten text within the segment.

6. The method of claim 2, further comprising
generating, by the processing circuitry and as the modified version of the digital document, a second selectable version of the digital document, wherein the second selectable version of the digital document includes the recognized printed text within the segment.

7. The method of claim 1, further comprising
obtaining, by the processing circuitry, the threshold value from a reference table comprising threshold values based on a type of the zonal parameter value, each of the threshold values being based on a corresponding handwritten text distribution profile and corresponding printed text distribution profile from a database,
the corresponding handwritten text distribution profile being based on a histogram associated with text zones labeled as handwritten text, and
the corresponding printed text distribution profile being based on a histogram associated with text zones labeled as printed text.

8. The method of claim 7, wherein each of the histograms are based on a comparison of a parameter value for an object within a labeled text zone and a corresponding ranking for the object, the corresponding ranking being based on the parameter value for the object and parameter values for each other object within the labeled text zone.

9. The method of claim 1, wherein the selection of the intersection of the handwritten text distribution profile and the printed text distribution profile includes
maximizing, by the processing circuitry, an area under a curve for each of the handwritten text distribution profile and the printed text distribution profile, the threshold value being a value above which the segment is likely to be handwritten text.

10. The method of claim 1, wherein the classifying includes
calculating, by the processing circuitry, a zonal ranking value based on the determined zonal parameter value and ranking values associated with each of the at least one parameter value, and
comparing, by the processing circuitry, the zonal ranking value to the threshold value, the segment of the digital document being classified as a handwritten text zone when the zonal ranking value satisfies the threshold value.

11. A non-transitory computer-readable medium storing instructions which when executed by a computer, cause the computer to perform a method, the method comprising:
determining, based on at least one parameter value associated with a segment of a digital document, a zonal parameter value;
classifying the segment of the digital document as a handwritten text zone or as a printed text zone based on the determined zonal parameter value and a threshold value, the threshold value being based on a selection of an intersection of a handwritten text distribution profile and a printed text distribution profile, each of the handwritten text distribution profile and the printed text distribution profile being associated with a zonal parameter corresponding to the determined zonal parameter value; and
generating, based on the classifying, a modified version of the digital document.

12. The non-transitory computer-readable medium of claim 11, further comprising
performing, when the segment is classified as a handwritten text zone, handwritten character recognition on the segment to recognize the handwritten text, and
performing, when the segment is classified as a printed text zone, printed character recognition on the segment to recognize the printed text.

13. The non-transitory computer-readable medium of claim 11, wherein the determined zonal parameter value is an object density value calculated by
multiplying a segment ratio by a segment height, the segment ratio being a ratio of a number of objects in the segment to a segment width.

14. The non-transitory computer-readable medium of claim 11, wherein the generating the modified version of the digital document includes
assigning, when the segment is classified as a handwritten text zone, a handwritten text identifier to the segment, and
assigning, when the segment is classified as a printed text zone, a printed text identifier to the segment.

15. The non-transitory computer-readable medium of claim 12, further comprising
generating, as the modified version of the digital document, a first selectable version of the digital document, wherein the first selectable version of the digital document includes the recognized handwritten text within the segment and the recognized printed text within the segment.

16. The non-transitory computer-readable medium of claim 11, further comprising
obtaining the threshold value from a reference table comprising threshold values based on a type of the zonal parameter value, each of the threshold values being based on a corresponding handwritten text distribution profile and corresponding printed text distribution profile from a database,
the corresponding handwritten text distribution profile being based on a histogram associated with text zones labeled as handwritten text, and
the corresponding printed text distribution profile being based on a histogram associated with text zones labeled as printed text.

17. The non-transitory computer-readable medium of claim 16, wherein each of the histograms are based on a comparison of a parameter value for an object within a labeled text zone and a corresponding ranking for the object, the corresponding ranking being based on the parameter value for the object and parameter values for each other object within the labeled text zone.

18. The non-transitory computer-readable medium of claim 11, wherein the selection of the intersection of the handwritten text distribution profile and the printed text distribution profile includes maximizing an area under a curve for each of the handwritten text distribution profile and the printed text distribution profile, the threshold value being a value above which the segment is likely to be handwritten text.

19. The non-transitory computer-readable medium of claim 11, wherein the classifying includes
calculating a zonal ranking value based on the determined zonal parameter value and ranking values associated with each of the at least one parameter value, and comparing the zonal ranking value to the threshold value, the segment of the digital document being classified as a handwritten text zone when the zonal ranking value satisfies the threshold value.

20. An apparatus, comprising:

processing circuitry configured to determine, based on at least one parameter value associated with a segment of a digital document, a zonal parameter value, classify the segment of the digital document as a handwritten text zone or as a printed text zone based on the determined zonal parameter value and a threshold value, the threshold value being based on a selection of an intersection of a handwritten text distribution profile and a printed text distribution profile, each of the handwritten text distribution profile and the printed text distribution profile being associated with a zonal parameter corresponding to the determined zonal parameter value, and generate, based on the classifying, a modified version of the digital document.

\* \* \* \* \*